(12) United States Patent
Kim et al.

(10) Patent No.: US 12,101,585 B2
(45) Date of Patent: Sep. 24, 2024

(54) SPEAKER MODULE MOUNTING STRUCTURE AND ELECTRONIC DEVICE INCLUDING THE SAME

(71) Applicant: Samsung Electronics Co., Ltd., Gyeonggi-do (KR)

(72) Inventors: Donghyun Kim, Gyeonggi-do (KR); Youngbae Park, Gyeonggi-do (KR); Juyoung Yu, Gyeonggi-do (KR); Nammin Jo, Gyeonggi-do (KR); Joonrae Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 17/726,770

(22) Filed: Apr. 22, 2022

(65) Prior Publication Data

US 2022/0345802 A1 Oct. 27, 2022

Related U.S. Application Data

(63) Continuation of application No. PCT/KR2022/005352, filed on Apr. 13, 2022.

(30) Foreign Application Priority Data

Apr. 22, 2021 (KR) .......................... 10-2021-0052454

(51) Int. Cl.
*H04R 1/02* (2006.01)
*G02C 11/00* (2006.01)
*H04R 1/10* (2006.01)

(52) U.S. Cl.
CPC ............. *H04R 1/025* (2013.01); *H04R 1/026* (2013.01); *H04R 1/028* (2013.01); *G02C 11/10* (2013.01); *H04R 1/105* (2013.01); *H04R 1/1075* (2013.01)

(58) Field of Classification Search
CPC ........ H04R 1/025; H04R 1/026; H04R 1/028; H04R 1/105; H04R 1/1075; G02C 11/10
See application file for complete search history.

(56) References Cited

U.S. PATENT DOCUMENTS 11,598,979 B1 * 3/2023 Johnson ................. H04R 1/345
2004/0071303 A1 4/2004 Furuya et al.
(Continued)

FOREIGN PATENT DOCUMENTS

EP 3299864 A1 3/2018
EP 3439322 A1 2/2019
(Continued)

OTHER PUBLICATIONS

Machine translation of KR20160107205A Dai et al., Loudspeaker Module and Electronic Device Comprising the Loudspeaker Module; published 2016.*
(Continued)

*Primary Examiner* — Andrew Sniezek
(74) *Attorney, Agent, or Firm* — Cha & Reiter, LLC

(57) ABSTRACT

According to certain embodiments, an apparatus comprises: an upper case facing a first direction; a lower case facing a second direction opposite to the first direction, the lower case coupled to the upper case, thereby forming an internal space; a speaker module disposed in the internal space, wherein the speaker module includes: a speaker; a bracket surrounding at least a part of the speaker, the bracket comprising: a first opening positioned to receive sound generated from the speaker; at least one first part coupled with the upper case; and at least one second part coupled with the lower case; at least one first sealing member disposed on the at least one first part of the bracket and sealing the bracket and the upper case; and a second sealing
(Continued)

member disposed on the at least one second part of the bracket and sealing the bracket and the lower case.

20 Claims, 10 Drawing Sheets

(56) References Cited

U.S. PATENT DOCUMENTS

| | | |
|---|---|---|
| 2013/0108082 A1 | 5/2013 | Dave et al. |
| 2014/0105440 A1 | 4/2014 | Mittleman et al. |
| 2015/0245514 A1 | 8/2015 | Choung et al. |
| 2016/0323675 A1 | 11/2016 | Dai et al. |
| 2017/0048364 A1 | 2/2017 | Park et al. |
| 2018/0279029 A1 | 9/2018 | Saini et al. |
| 2019/0072903 A1 | 3/2019 | Park et al. |
| 2020/0177979 A1 | 6/2020 | Cho et al. |
| 2020/0196046 A1 | 6/2020 | Park et al. |
| 2021/0088979 A1 | 3/2021 | Son et al. |
| 2021/0337055 A1 | 10/2021 | Lee et al. |

FOREIGN PATENT DOCUMENTS

| | | | | |
|---|---|---|---|---|
| EP | 3461111 A1 | 3/2019 | | |
| JP | 2019-62421 A | 4/2019 | | |
| KR | 10-2004-0031662 A | 4/2004 | | |
| KR | 10-2011-0090697 A | 8/2011 | | |
| KR | 10-2015-0099295 A | 8/2015 | | |
| KR | 10-2015-0112468 A | 10/2015 | | |
| KR | 20160107205 A | * 9/2016 | ............... | H04R 1/28 |
| KR | 10-2017-0140277 A | 12/2017 | | |
| KR | 10-2019-0026461 A | 3/2019 | | |
| KR | 10-2020-0067475 A | 6/2020 | | |
| KR | 10-2020-0085069 A | 7/2020 | | |

OTHER PUBLICATIONS

International Search Report dated Jul. 22, 2022.
Extended European Search Report dated Jul. 11, 2024.

* cited by examiner

SPEAKER MODULE MOUNTING STRUCTURE AND ELECTRONIC DEVICE INCLUDING THE SAME

CROSS-REFERENCE TO RELATED APPLICATION(S)

This application is a continuation of International Application No. PCT/KR2022/005352 designating the United States, filed on Apr. 13, 2022, in the Korean Intellectual Property Receiving Office and claiming priority to Korean Patent Application No. 10-2021-0052454, filed on Apr. 22, 2021, in the Korean Intellectual Property Office, the disclosures of which are incorporated by reference herein in their entireties.

BACKGROUND

Field

Certain embodiments of the disclosure relate to a speaker module mounting structure disposed in an internal space of an electronic device.

Description of Related Art

Electronic devices can be small and light enough to be carried or worn on a user's body. For example, wearable electronic devices can include a head-mounted device (HMD), a smart watch (or band), a contact lens-type device, a ring-type device, a glove-type device, a shoe-type device, or a clothing-type device. Since a wearable electronic device is directly worn on the body, portability and user accessibility may be improved.

The head-mounted device can be worn near the user's eyes and may provide augmented reality (AR) to the user. For example, the head-mounted device providing AR may be implemented in the form of glasses, and may provide information about objects in the field of view. The information can be in the form of images or characters. The head-mounted device may provide virtual reality (VR) to the user. For example, the head-mounted device may provide a sense of immersion. The sensor of immersion may be achieved by outputting independent images to both eyes of the user and content in the form of an image and sound. The content may be provided from an external input.

The small size of electronic devices can reduce the performance of a speaker. Moreover, it may be difficult to insert the speaker into a small electronic device. Accordingly, there is a need for a speaker module mounting structure which may be mounted into an electronic device.

SUMMARY

According to certain embodiments, an apparatus comprises: an upper case facing a first direction; a lower case facing a second direction opposite to the first direction, the lower case coupled to the upper case, thereby forming an internal space; a speaker module disposed in the internal space, wherein the speaker module includes: a speaker; a bracket surrounding at least a part of the speaker, the bracket comprising: a first opening positioned to receive sound generated from the speaker; at least one first part coupled with the upper case; and at least one second part coupled with the lower case; at least one first sealing member disposed on the at least one first part of the bracket and sealing the bracket and the upper case; and a second sealing member disposed on the at least one second part of the bracket and sealing the bracket and the lower case.

According to certain embodiments, an electronic device comprises: a lens frame accommodating a display member therein; a wearing member extended from the lens frame, and including a first case forming an outside of the wearing member and a second case forming an inside of the wearing member; a speaker module disposed inside the wearing member, wherein the speaker module includes: a speaker; and a bracket surrounding at least a part of the speaker and including a first opening positioned to receive sound generated from the speaker, wherein the bracket comprises: at least one first part coupled with the first case; and at least one second part coupled with the second case; at least one first sealing member disposed on the at least one first part of the bracket and sealing the bracket and the first case; and a second sealing member disposed on the at least one second part of the bracket and sealing the bracket and the second case.

Other aspects, advantages, and salient features of the disclosure will become apparent to those skilled in the art from the following detailed description, which, taken in conjunction with the annexed drawings, discloses exemplary embodiments, of the disclosure.

According to certain embodiments of the disclosure, it may be provided that a speaker module mounting structure capable of mounting in an electronic device while maintaining the performance of the speaker.

DETAILED DESCRIPTION

According to certain embodiments of the disclosure, there is provided an electronic device having a speaker module mounting structure mounted in a narrow space, while ensuring the size of a speaker module as much as possible by sealing a bracket included in the speaker module and housing(s) surrounding the speaker module.

However, the objects to be achieved in the disclosure are not limited to the above objects, and may be variously extended within the spirit and scope of the disclosure.

Figure 1:
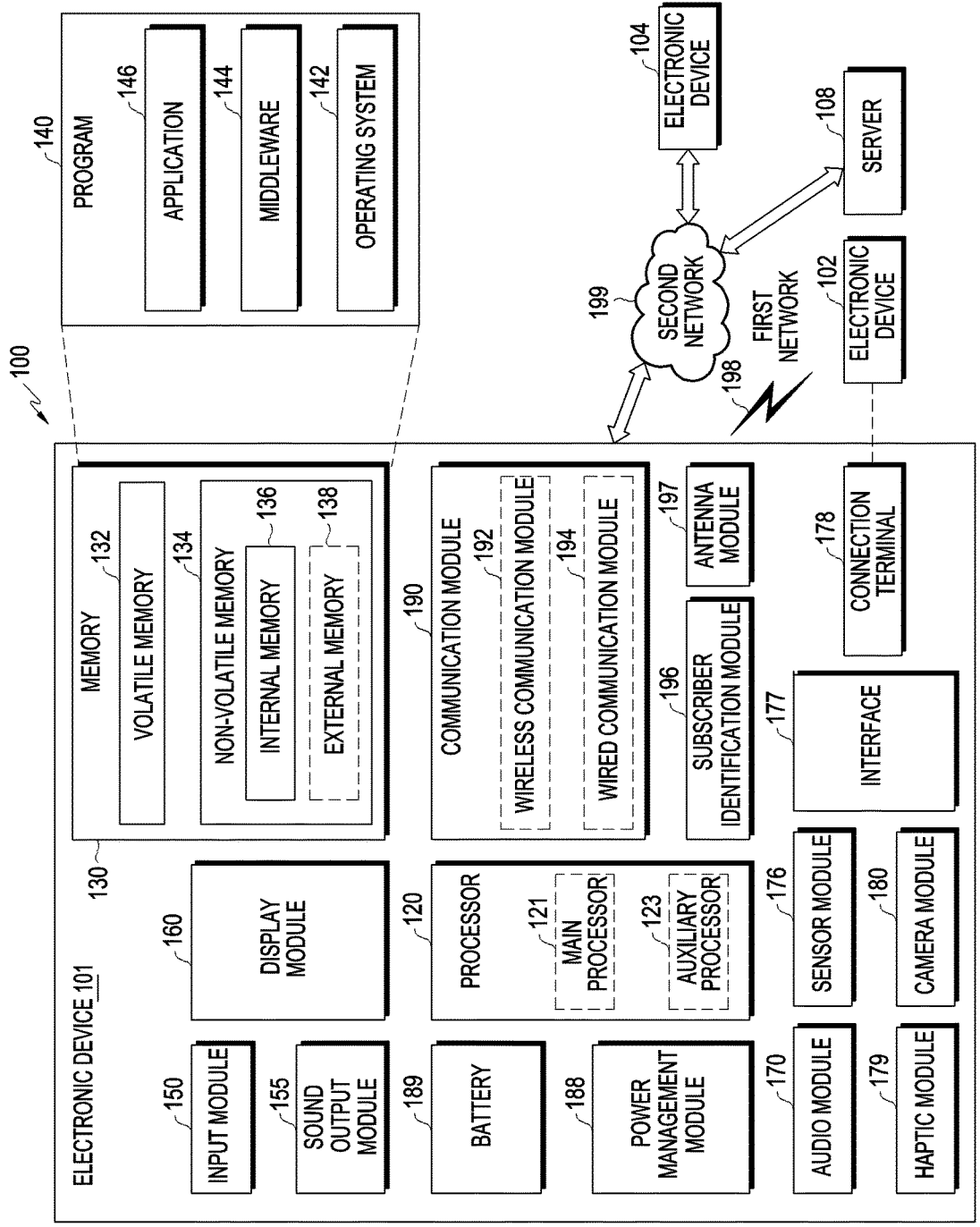
FIG. 1 is a block diagram illustrating an electronic device in a network environment according to certain embodiments of the disclosure.
Figure 2:
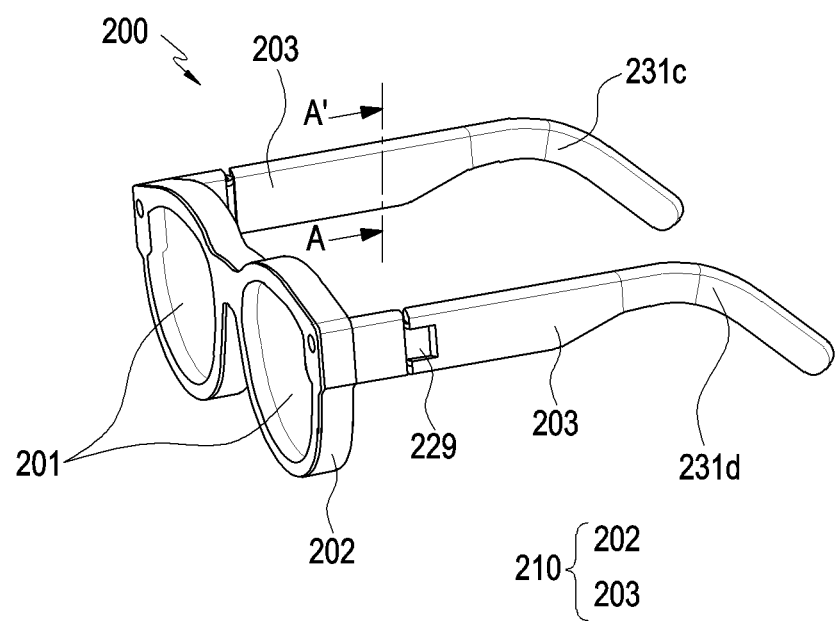
FIG. 2 is a perspective view illustrating an electronic device according to certain embodiments of the disclosure.
Figure 3:
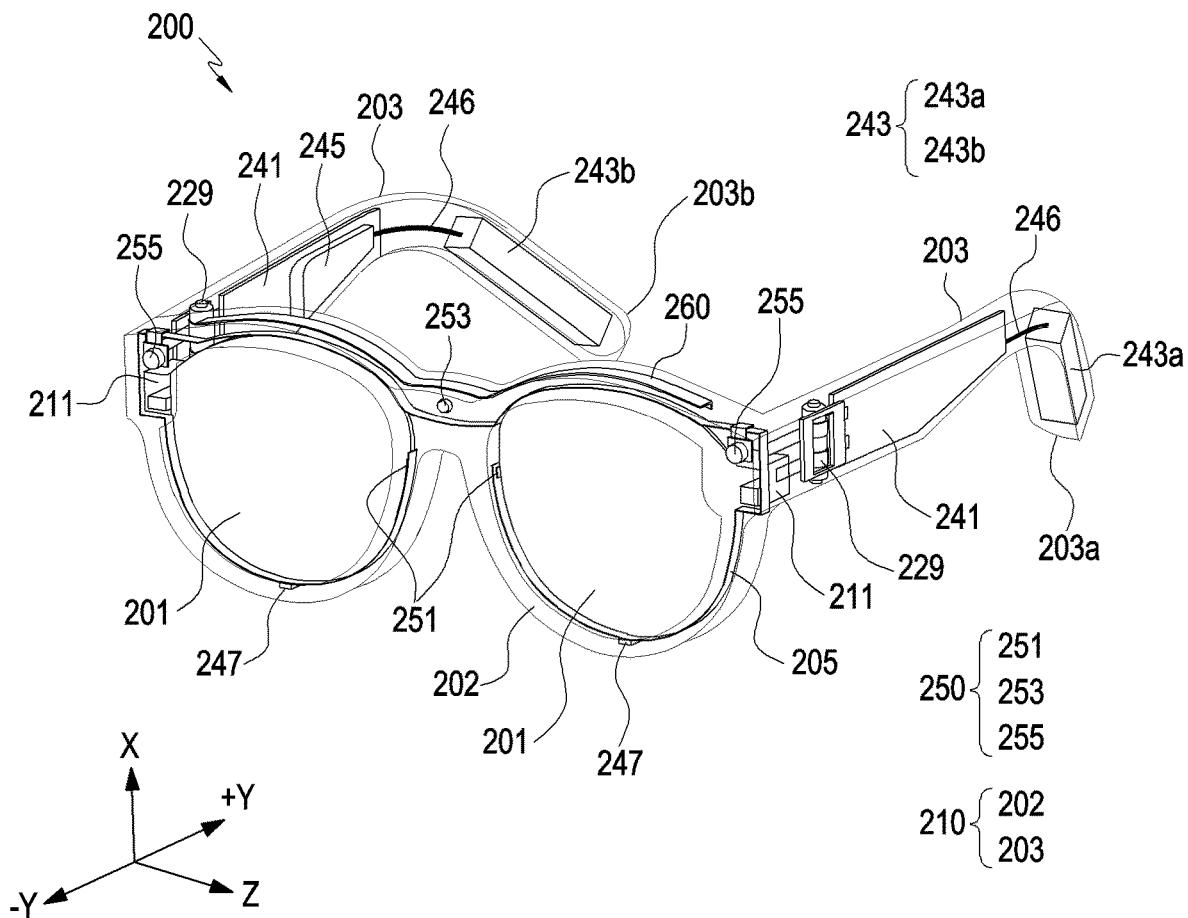
FIG. 3 is a perspective view illustrating the internal configuration of an electronic device according to an embodiment of the disclosure.
Figure 4:
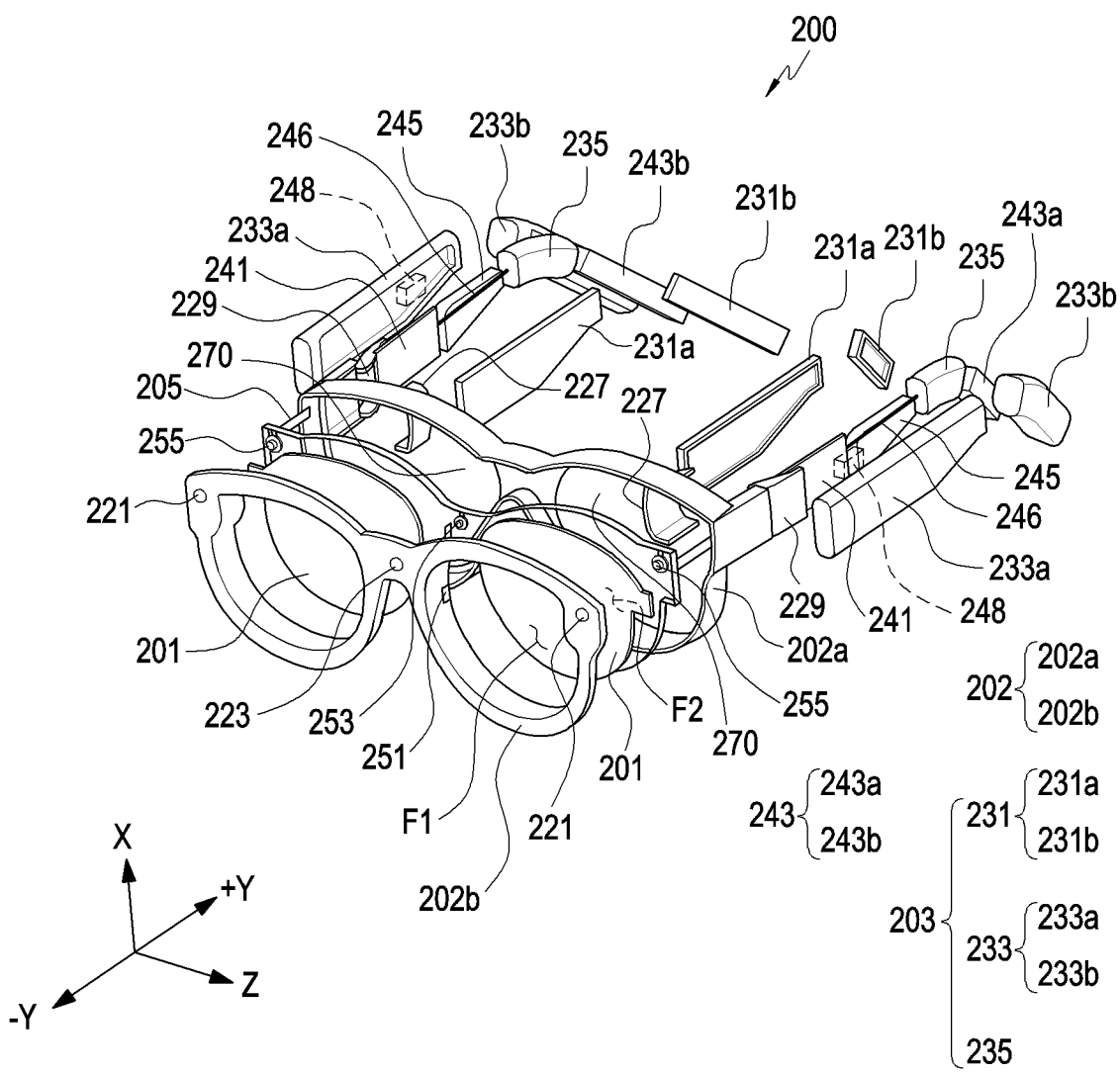
FIG. 4 is an exploded perspective view illustrating an electronic device according to certain embodiments of the disclosure.

FIG. 1 describes an electronic device 101 wherein the speaker module mounting structure may be mounted. Moreover, the electronic device 101 may be made small and light enough to be a wearable electronic device. FIGS. 2-4 describe a wearable electronic device 200. Due to the small size of the electronic device 101, and wearable electronic device 200, it can be difficult to insert a speaker module without degrading its performance. Accordingly, at least FIG. 5 describes a speaker module mounting structure that can be mounted into a narrow space of an electronic device, such as the electronic device 101 or wearable electronic device 200.

Electronic Device

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5$ms$ or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device 101 can be made small and light enough to be wearable by the user. For example, the electronic device 101 can be a wearable electronic device such as a head-mounted device (HMD), a smart watch (or band), a contact lens-type device, a ring-type device, a glove-type device, a shoe-type device, or a clothing-type device. FIGS. 2-4 describe a wearable electronic device that is a head-mounted display.

Wearable Electronic Device

FIG. 2 is a perspective view illustrating an electronic device according to an embodiment of the disclosure.

Referring to FIG. 2, an electronic device 200 is a glasses-type wearable electronic device, and a user may visually recognize an object or environment around the user, while wearing the electronic device 200. For example, the electronic device 200 may be a head-mounted device (HMD) or smart glasses capable of providing an image directly in front of the user's eyes. The electronic device 200 illustrated in FIG. 2 may include some, all, and/or additional components to the electronic device 101 illustrated in FIG. 1.

The electronic device 200 may include a housing 210 forming the exterior of the electronic device 200. The housing 210 may provide a space in which components of the electronic device 200 may be arranged. For example, the housing 210 may include a lens frame 202 and at least one wearing member 203.

The electronic device 200 may include at least one display member 201 that provide visual information to the user. For example, the display member 201 may include a module equipped with a lens, a display, a waveguide, and/or a touch circuit. The display member 201 may be formed to be transparent or translucent. The display member 201 may include a glass made of a translucent material or a window member in which the transmittance of light may be adjusted by adjusting a color concentration. A pair of display members 201 may be provided and disposed in correspondence with the user's left and right eyes, respectively, while the electronic device 200 is worn on the user's body.

The lens frame 202 may accommodate at least a part of the display member 201. For example, the lens frame 202 may surround at least a part of the periphery of the display member 201. The lens frame 202 may position the at least one display member 201 in correspondence with an eye of the user. The lens frame 202 may be the rim of a general glasses structure. The lens frame 202 may include at least one closed loop surrounding the display member 201.

The wearing member 203 may extend from the lens frame 202. For example, the wearing member 203 may extend from an end of the lens frame 202 and, together with the lens frame 202, may be supported or positioned on the user's body (e.g., an ear). The wearing member 203 may be rotatably coupled with the lens frame 202 through a hinge structure 229. The wearing member 203 may include an inner side surface 231c configured to face the user's body and an outer side surface 231d opposite to the inner side surface 231c.

The electronic device 200 may include the hinge structure 229 configured to fold the wearing member 203 with respect to the lens frame 202. The hinge structure 229 may be disposed between the lens frame 202 and the wearing member 203. When the user does not wear the electronic device 200, the user may carry or keep the electronic device 200 with the wearing member 203 folded to partially overlap with the lens frame 202.

Additionally, the electronic device 200 may provide augmented reality or virtual reality. To enhance the user experience, the electronic device 200 may include a speaker in close proximity to the user's ear. As can be seen, however, the wearing member 203 might be quite narrow for mounting a speaker.

FIG. 3 is a perspective view illustrating an internal configuration of an electronic device according to an embodiment of the disclosure. FIG. 4 is an exploded perspective view illustrating an electronic device according to certain embodiments of the disclosure. The electronic device 200 may include at least one speaker module 245.

Referring to FIGS. 3 and 4, the electronic device 200 may include components (e.g., at least one circuit board 241 (e.g., a printed circuit board (PCB), a printed board assembly (PBA), a flexible PCB (FPCB), or a rigid-flexible PCB (RFPCB)), at least one battery 243, at least one speaker module 245, at least one power transfer structure 246, and a camera module 250) accommodated in the housing 210. The configuration of the housing 210 illustrated in FIG. 3 may be fully or partially identical to the configurations of the display member 201, the lens frame 202, the wearing member 203, and the hinge structure 229 illustrated in FIG. 2.

The electronic device 200 may obtain and/or recognize a visual image of an object or environment in a direction (e.g., a −Y direction) viewed by the user or directed by the electronic device 200 by using the camera module 250 (e.g., the camera module 180 of FIG. 1), and receive information about the object or environment from an external electronic device (e.g., the electronic device 102 or 104 or the server 108 of FIG. 1) through a network *e.g., the first network 198 or the second network 199 of FIG. 1). In another embodiment, the electronic device 200 may provide the received information about the object or environment to the user, audibly or visually. The electronic device 200 may visually provide the received information about the object or environment to the user through the display member 201 by using a display module (e.g., the display module 160 of FIG. 1). For example, the electronic device 200 may implement AR by implementing the information about the object or environment in a visual form and combining the visual form with an actual image of the surroundings of the user.

The display member 201 may include a first surface F1 facing a direction in which external light is incident (e.g., the −Y direction) and a second surface F2 facing an opposite direction (e.g., a +Y direction) of the first surface F1. While the user wears the electronic device 200, at least a part of light or an image incident through the first surface F1 may pass through the second surface F2 of the display member 201 disposed to face the left and/or right eye of the user and/or may be incident on the left and/or right eye of the user.

The lens frame 202 may include at least two or more frames. For example, the lens frame 202 may include a first frame 202a and a second frame 202b. When the user wears the electronic device 200, the first frame 202a may be a frame of a part facing the user's face, and the second frame 202b may be a part of the lens frame 202 spaced apart from the first frame 202a in a gaze direction (e.g., the −Y direction) of the user.

A light output module 211 may provide an image and/or a video to the user. For example, the light output module 211 may include a display panel (not shown) outputting an image and a lens (not shown) corresponding to an eye of the user and guiding the image to the display member 201. For example, the user may obtain an image output from the display panel of the light output module 211 through the lens of the light output module 211. The light output module 211 may include a device configured to display various types of information. For example, the light output module 211 may include at least one of a liquid crystal display (LCD), a digital mirror device (DMD), a liquid crystal on silicon (LCoS), an organic light emitting diode (OLD), or a micro LED. When the light output module 211 and/or the display member 201 includes one of an LCD, a DMD, and an LCos, the electronic device 200 may include a light source irradiating light to a display area of the light output module 211 and/or the display member 201. When the light output module 211 and/or the display member 201 includes one of an OLDE and a micro LED, the electronic device 200 may provide a virtual image to the user without including a separate light source.

At least a part of the light output module 211 may be disposed in the housing 210. For example, the light output module 211 may be disposed in the wearing member 203 or the lens frame 202 to correspond to the right eye or the left eye of the user. The light output module 211 may be coupled to the display member 201 and provide an image to the user through the display member 201. For example, the image output from the light output module 211 may be incident on the display member 210 through an input optical member located at one end of the display member 201 and may be radiated toward the eye of the user through a waveguide and an output optical member located in at least a part of the display member 210. The waveguide may be formed of glass, plastic, or polymer, and may include a nano pattern formed on one inner or outer surface, for example, a polygonal or curved lattice structure. The waveguide may include at least one of a diffractive element (e.g., a diffractive optical element (DOE) or a holographic optical element (HOE)) or a reflective element (e.g., a reflective mirror).

The circuit board 241 may include components for driving the electronic device 200. For example, the circuit board 241 may include at least one integrated circuit chip, and at least one of the processor 120, the memory 130, the power management module 188, or the communication module 190 illustrated in FIG. 1 may be provided in the direct circuit chip. The circuit board 241 may be disposed within the wearing member 203 of the housing 210. The circuit board 241 may be electrically coupled to the battery 243 through the power transfer structure 246. The circuit board 241 may be coupled to an FPCB 205 and transmit an electrical signal to electronic components (e.g., the light output module 211, the camera module 250, and a light emitting unit (not shown)) of the electronic device through the FPCB 205. The circuit board 241 may be an interposer board.

The FPCB 205 may extend from the circuit board 241 to the inside of the lens frame 202 across the hinge structure 229, and may be disposed on at least a part of the circumference of the display member 201 inside the lens frame 202.

The battery 243 (e.g., the battery 189 of FIG. 1) may be electrically coupled to components (e.g., the light output module 211, the circuit board 241, the speaker module 245, a microphone module 247, and/or the camera module 250) of the electronic device 200 and supply power to the components of the electronic device 200.

At least a part of the battery 243 may be disposed in the wearing member 203. The battery 243 may be disposed adjacent to an end 203a or 203b of the wearing member 203. For example, the battery 243 may include a first battery 243a disposed at a first end 203a of a wearing member 203 and a second battery 243b disposed at a second end 203b of the wearing member 203.

The speaker module 245 (e.g., the audio module 170 or the sound output module 155 of FIG. 1) may convert an electrical signal into sound. At least a part of the speaker module 245 may be disposed inside the wearing member 203 of the housing 210. The speaker module 245 may be positioned inside the wearing member 203 in correspondence with the ear of the user. The speaker module 245 may be disposed next to the circuit board 241. For example, the speaker module 245 may be disposed between the circuit board 241 and the battery 243.

The electronic device 200 may include a connecting member 248 coupled to the speaker module 245 and the circuit board 241.

The power transfer structure 246 may transfer power of the battery 243 to an electronic component (e.g., the light output module 211) of the electronic device 200. For example, the power transfer structure 246 may be electrically coupled to the battery 243 and/or the circuit board 241, and the circuit board 241 may transfer power received through the power transfer structure 246 to the light output module 211.

The power transfer structure 246 may be configured to transfer power. For example, the power transfer structure 246 may include a FPCB or a wire. For example, the wire may include a plurality of cables (not shown). The shape of the power transfer structure 246 may be modified in various manners in consideration of the number and/or type of the cables.

The microphone module 247 (e.g., the input module 150 and/or the audio module 170 of FIG. 1) may convert sound into an electrical signal. The microphone module 247 may be disposed on at least a part of the lens frame 202. For example, at least one microphone module 247 may be disposed at a lower end (e.g., a direction toward a −X axis) and/or an upper end (e.g., a direction toward an X axis) of the electronic device 200. The electronic device 200 may more clearly recognize the user's voice by using voice information (e.g., sound) obtained from the at least one microphone module 247. For example, the electronic device 200 may distinguish between the voice information and surrounding noise based on the obtained voice information and/or additional information (e.g., low-frequency vibration of the user's skin and bones). For example, the electronic device 200 may clearly recognize the user's voice and execute a function of reducing ambient noise (e.g., noise canceling).

The camera module 250 may capture a still image and/or a video. The camera module 250 may include at least one of a lens, at least one image sensor, an image signal processor, or a flash. According to an embodiment, the camera module 250 may be disposed inside the lens frame 202 and disposed around the display member 201.

The camera module 250 may include at least one first camera module 251. The first camera module 251 may capture the trajectory of the user's eye (e.g., pupil) or the user's gaze. For example, the first camera module 251 may capture a reflection pattern of light emitted to the user's eyes by the light emitting unit (not shown). For example, the light emitting unit may emit light in an infrared band to track the trajectory of a gaze by using the first camera module 251. For example, the light emitting unit may include an IR LED. The processor (e.g., the processor 120 of FIG. 1) may adjust the position of a virtual image projected on the display member 201 to correspond to a direction in which the user's eyes gaze. The first camera module 251 may include a global shutter (GS)-type camera, and the trajectory of the user's eyes or gaze may be tracked by using a plurality of first camera modules 251 of the same standard and performance.

The first camera module 251 may periodically or aperiodically transmit information (e.g., trajectory information) related to the trajectory of the user's eyes or gaze to the processor (e.g., the processor 120 of FIG. 1). When detecting that the user's gaze has been changed (e.g., the movement of the eyes is equal to or greater than a reference value, while the head is not moving) based on the trajectory information, the first camera module 251 may transmit the trajectory information to the processor.

The camera module 250 may include a second camera module 253. The second camera module 253 may capture an external image. The second camera module 253 may be a global shutter-type or rolling shutter (RS)-type camera. The second camera module 253 may capture an external image through a second optical hole 223 formed in the second frame 202b. For example, the second camera module 253 may include a high-resolution color camera, and may be a high resolution (HR) camera or a photo video (PV) camera. In addition, the second camera module 253 may provide an auto focus function (AF) and an optical image stabilizer (OIS).

According to certain embodiments (not shown), the electronic device 200 may include a flash (not shown) positioned adjacent to the second camera module 253. For example, when the second camera module 253 obtains an external image, the flash (not shown) may provide light for increasing brightness (e.g., illuminance) around the electronic device 200 and reduce difficulty in obtaining an image, which is caused by a dark environment, mixing of various light sources, and/or reflection of light.

The camera module 250 may include at least one third camera module 255. The third camera module 255 may capture the user's motion through a first optical hole 221 formed in the lens frame 202. For example, the third camera module 255 may capture the user's gesture (e.g., hand motion). The third camera module 255 and/or the first optical hole 221 may be disposed at each of both side ends of the lens frame 202 (e.g., the second frame 202b), for example, at each of both ends of the lens frame 202 (e.g., the second frame 202b) in the X direction. The third camera module 255 may be a global shutter (GS)-type camera. For example, the third camera module 255 may provide a 360-degree space (e.g., an omni-directional space), location recognition, and/or movement recognition by means of a camera supporting 3 degrees of freedom (3 DoF) or 6 DoF. The third camera module 255 may perform a simultaneous localization and mapping (SLAM) function and a user motion recognition function by using a plurality of GS-type cameras of the same standard and performance, as stereo cameras. The third camera module 255 may include an IR camera (e.g., a time of flight (TOF) camera or a structured light camera). For example, the IR camera may operate as at least a part of a sensor module (e.g., the sensor module 176 of FIG. 1) for sensing a distance to a subject.

At least one of the first camera module 251 or the third camera module 255 may be replaced with a sensor module (e.g., the sensor module 176 of FIG. 1). For example, the sensor module may include at least one of a vertical cavity surface emitting laser (VCSEL), an IR sensor, and/or a photodiode. For example, the photodiode may include a positive intrinsic negative (PIN) photodiode or an avalanche photodiode (APD). The photodiode may be referred to as a photo detector or a photo sensor.

At least one of the first camera module 251, the second camera module 253, and the third camera module 255 may include a plurality of camera modules (not shown). For example, the second camera module 253 may include a plurality of lenses (e.g., wide-angle and telephoto lenses) and image sensors, and may be disposed on one surface (e.g., a surface facing the −Y axis direction) of the electronic device 200. For example, the electronic device 200 may include a plurality of camera modules each having a different attribute (e.g., angle of view) or function, and control the angle of view of a camera module to be changed based on user selection and/or trajectory information. For example, at least one of the plurality of camera modules may be a wide-angle camera, and at least another one of the plurality of camera modules may be a telephoto camera.

The processor (e.g., the processor 120 of FIG. 1) may determine a motion of the electronic device 200 and/or a user motion by information about the electronic device 200 obtained through at least one of a gesture sensor, a gyro sensor, or an acceleration sensor of a sensor module (e.g., the sensor module 176 of FIG. 1) and a user action (e.g., the user's body's approach to the electronic device 200) obtained through the third camera module 255. The electronic device 200 may include a magnetic (geomagnetic) sensor that measures a bearing by using a magnetic field and a line of magnetic force, and/or a hall sensor that obtains motion information (e.g., a movement direction or a movement distance) based on the intensity of a magnetic field. For example, the processor may determine the motion of the electronic device 200 and/or the user motion based on information obtained from the magnetic (geomagnetic) sensor and/or the hall sensor.

According to certain embodiments (not shown), the electronic device 200 may execute an input function (e.g., a touch and/or pressure sensing function) that enables interaction with the user. For example, a component (e.g., a touch sensor, and/or a pressure sensor) configured to execute the touch and/or pressure sensing function may be disposed in at least a part of the wearing member 203. The electronic device 200 may control a virtual image output through the display member 201 based on information obtained through the component. For example, a sensor related to the touch and/or pressure sensing function may be configured in various manners, such as a resistive type, a capacitive type, an electro-magnetic (EM) type, or an optical type. The configuration of the component configured to execute the touch and/or pressure sensing function may be fully or partially identical to that of the input module 150 of FIG. 1.

The electronic device 200 may include a reinforcing member 260 disposed in an internal space of the lens frame 202 and formed to have a rigidity higher than that of the lens frame 202.

The electronic device 200 may include a lens structure 270. The lens structure 270 may refract light at least partially. For example, the lens structure 270 may be a prescription lens having a specified refractive power. According to an embodiment, the lens structure 270 may be positioned between the display member 201 and the user's eye.

The housing 210 may include a hinge cover 227 that covers a part of the hinge structure 229. Another part of the hinge structure 229 may be accommodated or concealed between an inner case 231 and an outer case 233, which will be described later.

The wearing member 203 may include the inner case 231 and the outer case 233. The inner case 231 may be, for example, a case configured to face the user's body or directly contact the user's body, and may be formed of a material having a low thermal conductivity, for example, synthetic resin. According to an embodiment, the inner case 231 may include an inner side surface (e.g., the inner side surface 231c of FIG. 2) facing the user's body. The outer case (233) may include, for example, a material (e.g., metal material) that at least partially transfers heat, and may be bonded with the inner case 231, facing the inner case 231.

According to an embodiment, the outer case 233 may include an outer side surface (e.g., the outer side surface 231d of FIG. 2) opposite to the inner side surface 231c. In an embodiment, at least one of the circuit board 241 or the speaker module 245 may be accommodated in a space separated from the battery 243 in the wearing member 203. In the illustrated embodiment, the inner case 231 may include a first case 231a including the circuit board 241 and/or the speaker module 245 and a second case 231b accommodating the battery 243, and the outer case 233 may include a third case 233a coupled with the first case 231a, facing the first case 231a, and a fourth case 233b coupled with the second case 231b, facing the second case 231b. For example, the first case 231a and the third case 233a (hereinafter, referred to as a 'first case part 231a and 233a') may be coupled with each other to accommodate the circuit board 241 and/or the speaker module 245, and the second case 231b and the fourth case 233b (hereinafter, referred to as a 'second case part 231b and 233b') may be coupled with each other to accommodate the battery 243.

The first case part 231a and 233a may be rotatably coupled with the lens frame 202 through the hinge structure 229, and the second case part 231b and 233b may be coupled or mounted to an end of the first case part 231a and 233a through a connection structure 235. In some embodiments, a part of the connection structure 235, which contacts the user body, may be formed of a material with a low thermal conductivity, for example, an elastic material such as silicon, polyurethane, or rubber, and a part of the connection structure 235, which does not contact the user body, may be formed of a material (e.g., metal material) with a high thermal conductivity. For example, when heat is generated in the circuit board 241 or the battery 243, the connection structure 235 may block the heat from being transferred to the part in contact with the user's body and disperse or dissipate heat through the part not in contact with the user's body. According to an embodiment, the part of the connection structure 235 configured to contact the user's body may be interpreted as a part of the inner case 231, and the part of the connection structure 235 that does not contact the user's body may be interpreted as a part of the outer case 233. According to an embodiment (not shown), the first case 231a and the second case 231b may be integrally formed without the connection structure 235, and the third case 233a and the fourth case 233b may be integrally formed without the connection structure 235. Other components (e.g., the antenna module 197 of FIG. 1) may be further included in addition to the illustrated components, and information about an object or environment may be received from an external electronic device (the electronic device 102 or 104 or the server 108 of FIG. 1) through a network (e.g., the first network 198 or the second network 199 of FIG. 1) by using the communication module 190.

While the electronic device 200 has been described as a glasses-type wearable electronic device with reference to FIGS. 2 to 4, by way of example, the disclosure is not limited thereto. For example, the electronic device 200 may refer to a device that performs a specific function according to a loaded program, such as an electronic notebook, a portable multimedia player, a mobile communication terminal, a tablet PC, a video/audio device, a desktop/laptop computer, a navigation for a vehicle, and the disclosure may be applied to any electronic device equipped with a speaker module among these electronic devices.

As can be seen, the speaker module 245 is mounted in a narrow area of the electronic device 200. FIGS. 5-12 will describe a speaker module mounting structure according to certain embodiments of this disclosure.

Figure 5:
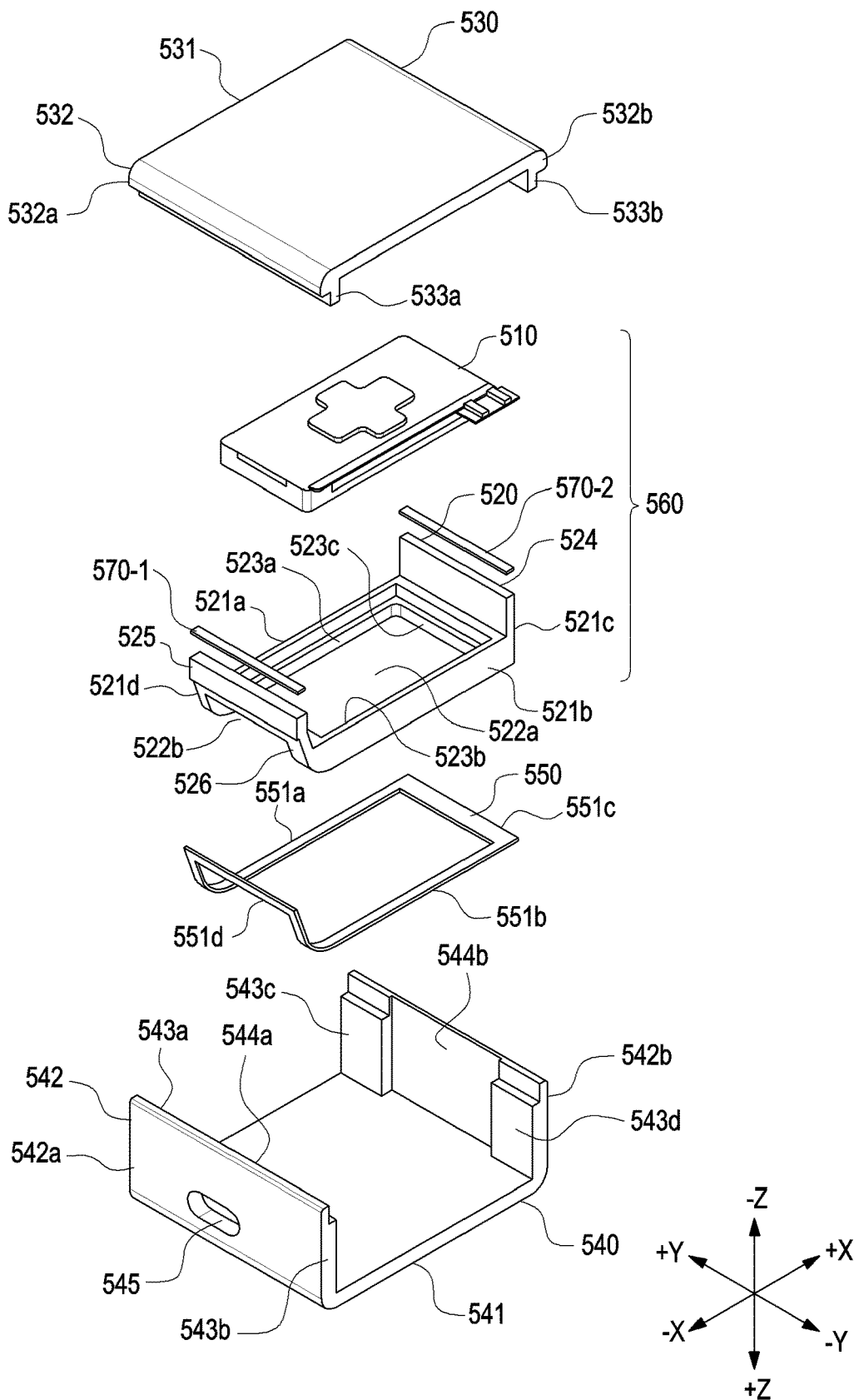
FIG. 5 is an exploded perspective view illustrating a speaker module mounting structure formed on one side of an electronic device according to certain embodiments of the disclosure.
Figure 6:
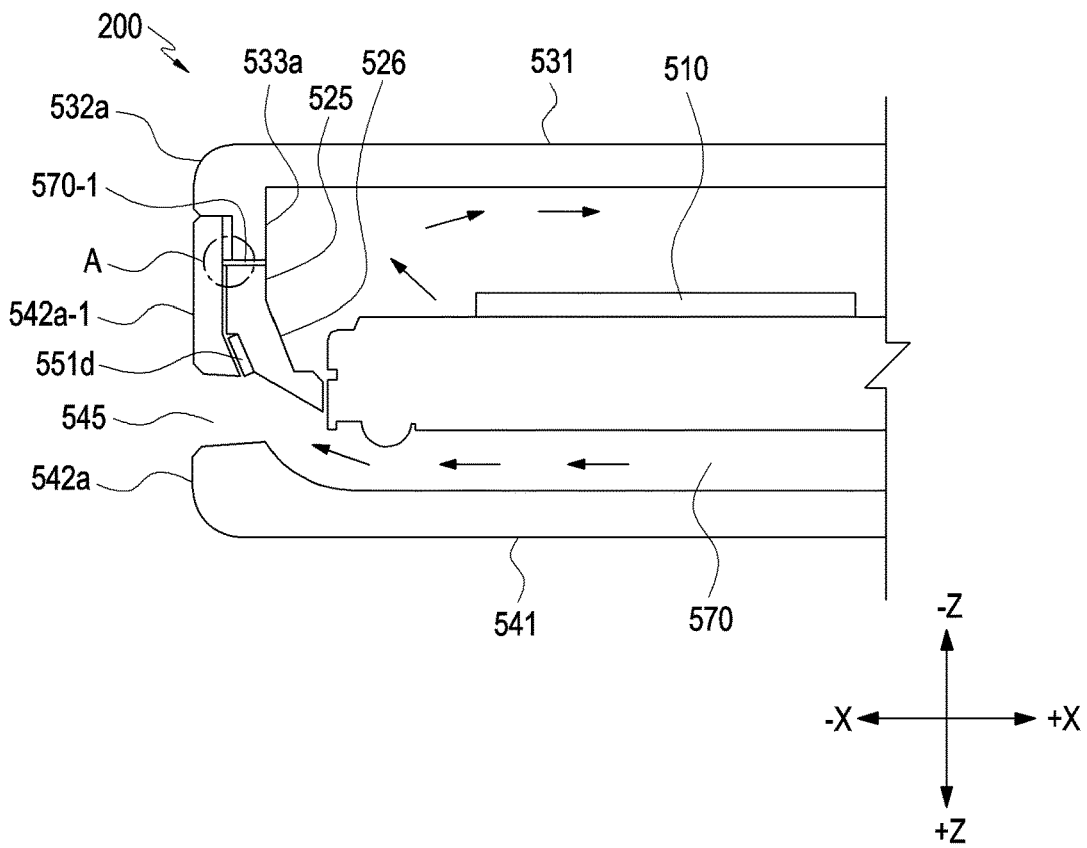
FIG. 6 is a sectional view illustrating one side of the electronic device of FIG. 2, taken along a direction A-A' according to certain embodiments of the disclosure.
Figure 7:
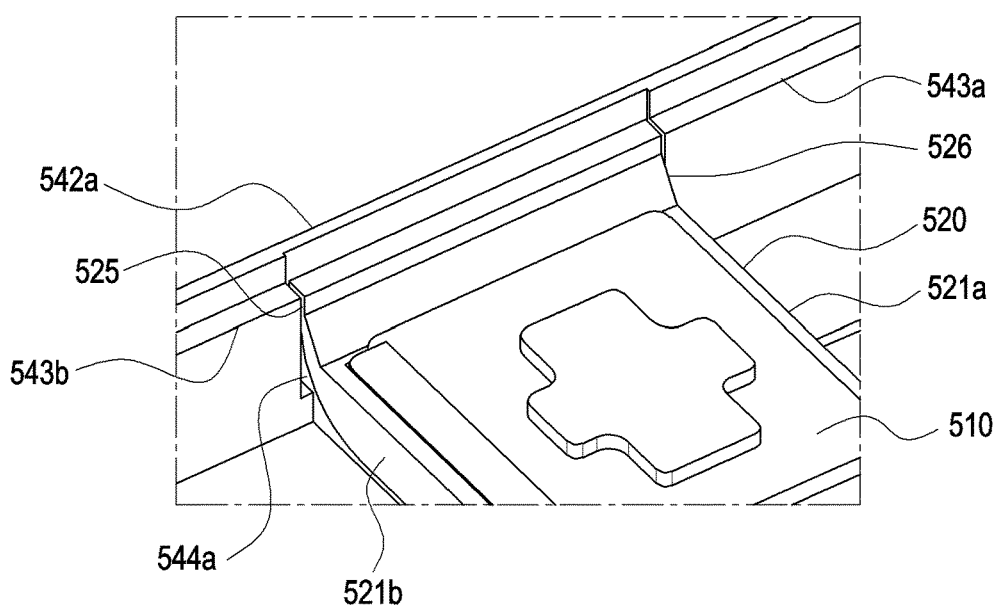
FIG. 7 is a perspective view illustrating a structure in which a speaker module is mounted in one of housings according to certain embodiments of the disclosure.

FIG. 5 is an exploded perspective view illustrating a speaker module mounting structure formed on one side of an electronic device according to certain embodiments of the disclosure. FIG. 6 is a sectional view illustrating one side of the electronic device of FIG. 2, taken along a direction A-A' according to certain embodiments of the disclosure. FIG. 7 is a perspective view illustrating a structure in which a speaker module is mounted in one of housings according to certain embodiments of the disclosure.

Referring to FIGS. 5 to 7, a speaker module may have a structure in which a bracket is coupled with a separate carrier including a speaker.

An electronic device (e.g., the electronic device 200 of FIGS. 1 to 5) may include a speaker module 560 disposed in a housing (e.g., the housing 203 of FIG. 2). The speaker module mounting structure may include a part (e.g., an upper case 530 and a lower case 540) of the housing and the speaker module 560. The speaker module mounting structure may include the upper case 530, the lower case 540, a speaker 510, a bracket 520. The upper case 530 and the lower case 540 provide an internal space for disposing the speaker 510 and the bracket 520, therein. Sealing member 550 is disposed between the bracket 520 and the lower case 540. A structure in which the speaker 510 is disposed in the internal space of the bracket 520 may be the speaker module 560, and the speaker module 560 may be mounted in the upper case 530 and the lower case 540 of the housing 203. It shall be understood that "upper case" and "lower case" do not necessitate that the upper case 530 be above the lower case 540 when the speaker mounting module structure is placed inside of, or forms a portion of, an electronic device.

The upper case 530 and the lower case 540 of the mounting structure and the speaker module 560 in FIGS. 5 to 7 may be fully or partially identical in configuration to the first case 231a of the outer case 233, the first case 231a of the inner case 231, and the speaker module 245 in FIG. 4.

The lower case 540 of the housing 203 may include a first plate 541 and a sidewall 542 extending from the first plate 541 in a first direction (−Z-axis direction). The side wall 542 may include a first side wall 542a formed to extend from the first plate 541 and face a third direction (−X-axis direction), and a second side wall 542b formed to extend from the first plate 541 and face a fourth direction (+X-axis direction).

The first side wall 542a may include a first protrusion 543a and a second protrusion 543b which protrude (e.g., in the fourth direction (+X-axis direction) from an inner surface of the first sidewall 542a into a space for mounting the speaker module 560 therein. The first protrusion 543a and the second protrusion 543b may be spaced apart from each other. According to an embodiment, a first recess 544a may be formed between the first protrusion 543a and the second protrusion 543b on the inner surface of the first side wall 542a. According to an embodiment, the first sidewall 542a may include an opening 545 for discharging a front sound of the speaker module 560 to the outside along a conduit 570, at a part between the first protrusion 543a and the second protrusion 543b.

The second side wall 542b may include a third protrusion 543c and a fourth protrusion 543d which protrude (e.g., in the third direction (−X-axis direction) from an inner surface of the second sidewall 542b into the space for mounting the speaker module 560 therein. The third protrusion 543c and the fourth protrusion 543d may be spaced apart from each other. According to an embodiment, a second recess 544b may be formed between the third protrusion 543c and the fourth protrusion 543d on the inner surface of the second side wall 542b.

The upper case 530 of the housing 203 may include a first plate 531 and a sidewall 532 extending from the first plate 531 in a second direction (+Z-axis direction). The sidewall 532 may include a first sidewall 532a formed to extend from the first plate 531 and face the third direction (−X-axis direction), and a second sidewall 532b formed to extend from the first plate 531 and face the fourth direction (+X-axis direction). According to an embodiment, the first side wall 532a may include a first protrusion 533a protruding from the inner surface of the first sidewall 532a (e.g., in the second direction (+Z-axis direction). According to one embodiment, the second sidewall 532b may include a second protrusion 533b protruding from the inner surface of the second sidewall 532b (e.g., in the second direction (+Z-axis direction).

The bracket 520 may include a first side wall 521a disposed to face a sixth direction (+Y-axis direction), a second sidewall 521b disposed to face in a fifth direction (−Y-axis direction) opposite to the sixth direction (+Y-axis direction), in parallel to the first sidewall 521a, a third sidewall 521c disposed to face the fourth direction (+X-axis direction), and a fourth sidewall 521d disposed to face the third direction (−X-axis direction) opposite to the fourth direction (+X-axis direction).

The bracket 520 may include a first opening 522a formed by combining the first sidewall 521a, the second sidewall 521b, the third sidewall 521c, and the fourth sidewall 521d.

The first sidewall 521a of the bracket 520 may include a first protrusion 523a protruding from an inner surface of the first sidewall 521a (e.g., in the fifth direction (−Y-axis direction) so that the speaker 510 may be disposed. According to an embodiment, the second sidewall 521b of the bracket 520 may include a second protrusion 523b protruding from an inner surface of the second sidewall 521b (e.g., in the sixth direction (+Y-axis direction)) so that the speaker 510 may be disposed. According to an embodiment, the third sidewall 521c of the bracket 520 may include a third protrusion 523c protruding from an inner surface of the third sidewall 521c (e.g., in the third direction (−X-axis direction)), so that the speaker 510 may be disposed, and a protrusion 524 protruding (e.g., in the first direction (−Z-axis direction)) to be coupled with the second sidewall 532b of the upper case 530 of the housing 203. The protrusion 524 can be at least one first part of the bracket that is coupled with the upper case 530. The fourth sidewall 521d of the bracket 520 may include a coupling portion 525 coupled with the first sidewall 532a of the upper case 530 of the housing 203 and the first sidewall 542a of the lower case 540. The fourth sidewall 521d may include a connecting portion 526 that connects the coupling portion 525 to the first sidewall 521a and the second sidewall 512b of the bracket 520. The connection portion 526 may include a second opening 522b extending from the first opening 522a. The connection portion 526 may be at least one second part of the bracket that is coupled with the lower case 540.

The sealing member 550 may include a first sealing portion 551a disposed between the first sidewall 521a of the bracket 520 and the first plate 541 of the lower case 540, a second sealing portion 551b disposed between the second sidewall 521b of the bracket 520 and the first plate 541 of the lower case 540, a third sealing portion 551c disposed between the third sidewall 521c of the bracket 540 and the first plate 541 of the lower case 540, and a fourth sealing portion 551d disposed between the connecting portion 526 included in the fourth sidewall 521d of the bracket 520 and the first recess 544a included in the first sidewall 542a of the lower case 540. According to an embodiment, the first sealing portion 551a, the second sealing portion 551b, the third sealing portion 551c, and the fourth sealing portion 551d of the sealing member 550 may be disposed in the shape of a closed loop along a contact surface on which the bracket 520 contacts the first plate 541 of the lower case 540 and a part of the first sidewall 542a of the lower case 540 to prevent leakage of sound waves of the internal space through a path outside a specified area or introduction of foreign materials including a fluid. The sealing member (550) may include, for example, poron, a tape, rubber, or bonding.

The speaker 510 may be disposed in the internal space formed by combining the first sidewall 521a, the second sidewall 521b, the third sidewall 521c, and the fourth sidewall 521d of the bracket 520 in the speaker module mounting structure. According to an embodiment, the speaker 510 may be fixed by the first protrusion 523a of the first sidewall 521a of the bracket 520, the second protrusion 523b of the second sidewall 521b of the bracket 520, and the third protrusion 523c of the third sidewall 521c of the bracket 520.

The speaker module 560 may be mounted in the lower case 540 of the housing 203 in the speaker module mounting structure. According to an embodiment, the third sidewall 521c including the third protrusion 523c in the bracket 520 may be mounted in the second recess 544b formed between the third protrusion 543c and the fourth protrusion 543d of the second sidewall 540 in the lower case 540. When the speaker module 560 is mounted in the lower case 540, the protrusion 524 included in the third sidewall 521c of the bracket 520 may be disposed to the same height as the third protrusion 543c and the fourth protrusion 543d of the second sidewall 542b of the lower case 540, in the first direction (−Z-axis direction).

The fourth sidewall 521d including the coupling portion 525 and the connecting portion 526 of the bracket 520 may be mounted in the first recess 541 formed between the first protrusion portion 543a and the second protrusion portion 543b of the first sidewall 540 of the lower case 540. When the speaker module 560 is mounted in the lower case 540, the coupling portion 525 included in the fourth sidewall 521d of the bracket 520 may be disposed to the same height as the first protrusion portion 543a and the second protrusion portion 543b of the first sidewall 540 of the lower case 540, in the first direction (−Z-axis direction).

A duct length of a speaker may be reduced or the size of the speaker module may be secured, according to a depth to which the speaker module 560 is mounted on the sidewall 542 of the lower case 540. When the speaker module 560 is mounted in the lower case 540, the first sealing portion 551a of the sealing member 550 may seal between the first sidewall 521a of the bracket 520 and the first sidewall 521a of the lower case 540. According to an embodiment, the second sealing portion 551b of the sealing member 550 may seal the second sidewall 521b of the bracket 520 and the first plate 541 of the lower case 540. According to an embodiment, the third sealing portion 551c of the sealing member 550 may seal between the third sidewall 521c of the bracket 520 and the first plate 541 of the lower case 540. The fourth sealing portion 551c of the sealing member 550 may seal between the connecting portion 526 included in the fourth sidewall 521d of the bracket 520 and the first sidewall 542a of the lower case 540. When the speaker module 560 is mounted in the lower case 540, the conduit 570 may be formed between the first opening 522a and the second opening 522b of the bracket 520 and the first plate 541 of the lower case 540.

The lower case 540 of the housing 203 in which the speaker module 560 is mounted may be coupled with the upper case 530 of the housing 203 in the speaker module mounting structure. The first protrusion 533a of the first sidewall 532a of the upper case 530 may be coupled in a space formed by a first-direction (−Z-axis direction) height difference between the first sidewall 542a of the lower case 540 and the first protrusion 543a of the first sidewall 542a, the second protrusion 543b of the first sidewall 542a, and the coupling portion 525 of the fourth sidewall 521d of the bracket 520. The first protrusion 533a of the first sidewall 532a of the upper case 530 may be sealed by the coupling portion 525 of the fourth sidewall 521d of the bracket 520 and a sealing member 570-1. The second protrusion 533b of the second sidewall 532b of the upper case 530 may be coupled in a space formed by a first direction (−Z-axis direction) height difference between the second sidewall 542b of the lower case 540 and the third protrusion 543d of the second sidewall 542b, the fourth protrusion 543d of the second sidewall 542b, and the protrusion 524 of the third sidewall 521c of the bracket 520. The second protrusion 533b of the second sidewall 532b of the upper case 530 may be sealed by the protrusion 524 of the third sidewall 521c of the bracket 520 and a sealing member 570-2.

The coupling portion 525 of the bracket 520 may be coupled and sealed to both the first protrusion 533a of the first sidewall 532a of the upper case 530 and the first sidewall 542a of the lower case 540 by the sealing member 571-1 in a part A in which the first protrusion 533a of the first sidewall 532a of the upper case 530, the first sidewall 542a of the lower case 540, and the coupling portion 525 of the bracket 520 are coupled to one another. Accordingly, a front sound and a rear sound of the speaker module 560 may be radiated without being mixed. Specific embodiments of a structure in which the coupling portion 525 of the bracket 520 is coupled and sealed to both the first protrusion portion 533a of the first sidewall 532a of the upper case 530 and the first sidewall 542a of the lower case 540 will be described below with reference to FIGS. 8 and 9.

Figure 8:
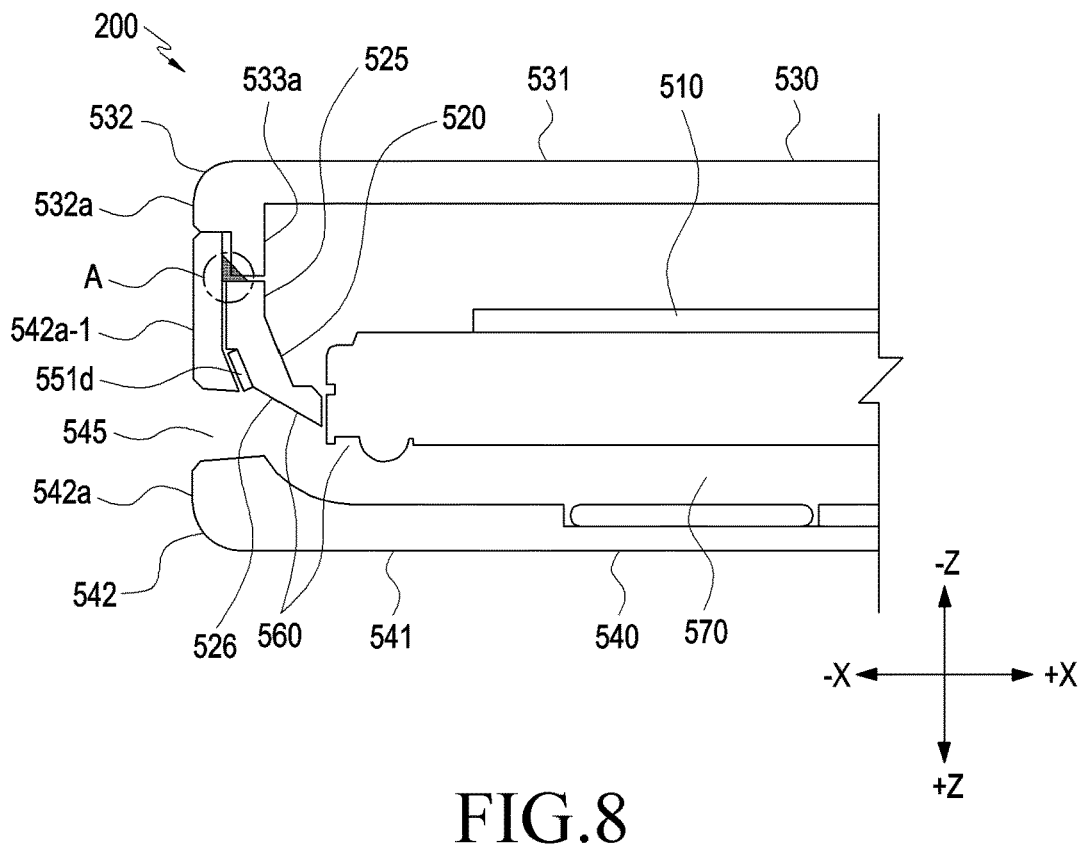
FIG. 8 is a sectional view illustrating a structure in which a bracket of a speaker module is mounted in both an upper case and a lower case by bonding, according to an embodiment of the disclosure.
Figure 9:
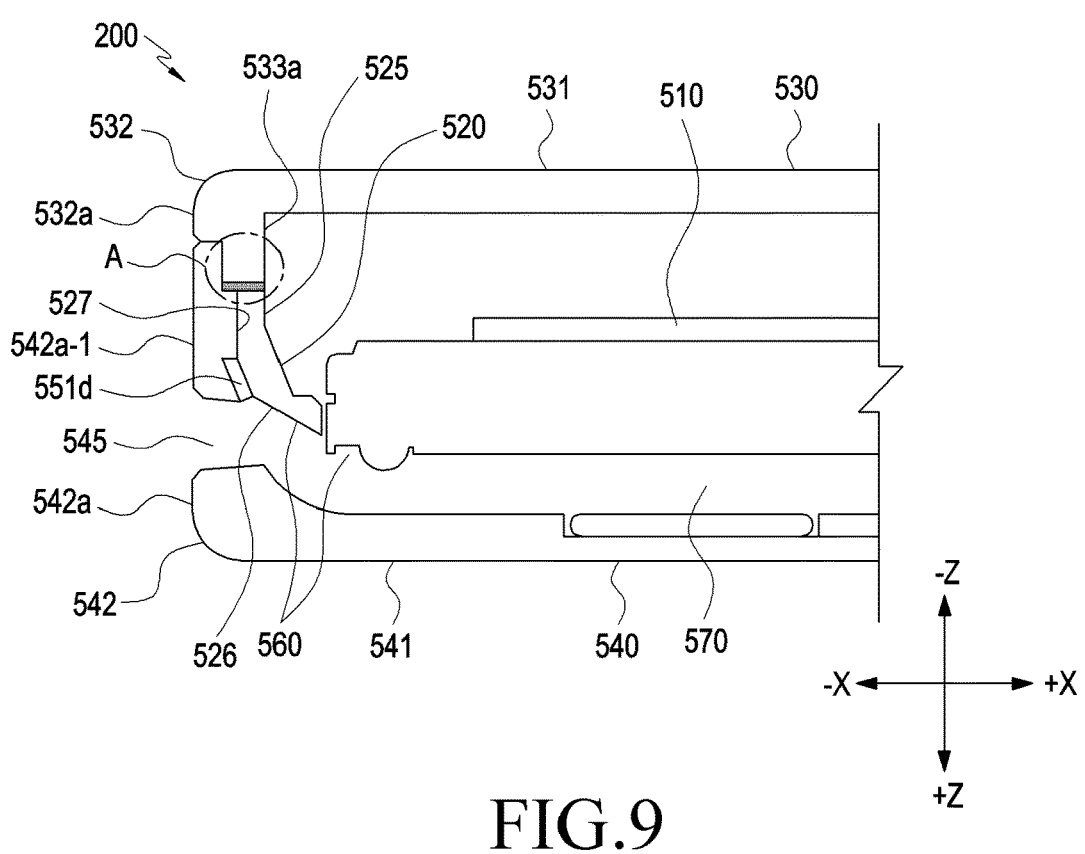
FIG. 9 is a sectional view illustrating a structure in which a bracket of a speaker module is mounted in both an upper case and a lower case by a tape according to another embodiment of the disclosure.

FIG. 8 is a sectional view illustrating a structure in which a bracket of a speaker module is mounted in both an upper case and a lower case by bonding, according to an embodiment of the disclosure, and FIG. 9 is a sectional view illustrating a structure in which a bracket of a speaker module is mounted in both an upper case and a lower case by a tape according to another embodiment of the disclosure.

The electronic device (e.g., the electronic device 200 of FIGS. 1 to 4) may include the speaker module 560 disposed in the housing (e.g., the housing 203 of FIG. 2). The speaker module mounting structure may include a part of the housing (e.g., the upper case 530 and the lower case 540) and the speaker module 560. The speaker module mounting structure may include the upper case 530, the lower case 540, the speaker 510, and the bracket 520 providing an internal space for disposing the speaker 510 therein. A structure in which the speaker 510 is disposed in the internal space of the bracket 520 may be the speaker module 560, and the speaker module 560 may be mounted in the upper case 530 and the lower case 540 of the housing 203.

The lower case 540 of the housing 203 may include the first plate 541 and the sidewall 542 extending from the first plate 541 in the first direction (−Z-axis direction). The sidewall 542 may include the first sidewall 542a formed to extend from the first plate 541 and face the third direction (−X-axis direction). The first sidewall 542a may include the opening 545 for discharging the front sound of the speaker module 560 to the outside along the conduit 570.

The upper case 530 of the housing 203 may include the first plate 531 and the sidewall 532 extending from the first plate 531 in the second direction (+Z-axis direction). The sidewall 532 may include the first sidewall 532a formed to extend from the first plate 531 and face the third direction (−X-axis direction). The first side wall 532a may include the first protrusion 533a protruding from the inner surface (e.g., protruding in the second direction (+Z-axis direction).

The bracket 520 may include the coupling portion 525 coupled with the first sidewall 532a of the upper case 530 and the first sidewall 542a of the lower case 540 in the housing 203. In a part A, the coupling portion 525 of the bracket 520 may be coupled with the first protrusion 533a of the first sidewall 532a of the upper case 520 and a part 542a-1 of the first sidewall 542a of the lower case 540.

The speaker 510, the bracket 520, the upper case 530, the lower case 540, the first plate 531 of the upper case 530, the first side wall 532a of the sidewall 532 of the upper case 530, the first protrusion 533a of the first side wall 532a of the upper case 530, the first plate 541 of the lower case 540, the first sidewall 542a of the sidewall 542 of the lower case 540, and the coupling portion 525 of the bracket 520 included in the speaker module mounting structure illustrated in FIGS. 8 and 9 may be fully or partially identical in configuration to the speaker 510, the bracket 520, the upper case 530, the lower case 540, the first plate 531 of the upper case 530, the first side wall 532a of the sidewall 532 of the upper case 530, the first protrusion 533a of the first side wall 532a of the upper case 530, the first plate 541 of the lower case 540, the first sidewall 542a of the sidewall 542 of the lower case 540, and the coupling portion 525 of the bracket 520 included in the speaker module mounting structure illustrated in FIGS. 5 to 7.

When the speaker module mounting structure may include a structure in which an area where the part 524a-1 of the first sidewall 542a of the lower case 540 faces the first protrusion 533a of the first sidewall 532a of the upper case 530 is sealed by bonding in the part A.

When the part 524a-1 of the first sidewall 542a of the lower case 540 includes a protrusion 527 protruding in the fourth direction (+X-axis direction) in an area in which the part 524a-1 of the first sidewall 542a of the lower case 540 faces the coupling portion 525 of the bracket 520 in the part A, the speaker module mounting structure may include a structure in which an area where the protrusion 527 included in the part 524a-1 of the first sidewall 542a of the lower case 540 and the coupling portion 525 of the bracket 520 face the first protrusion 533a of the first sidewall 532a of the upper case 530 is sealed by attaching a tape to the area.

Figure 10:
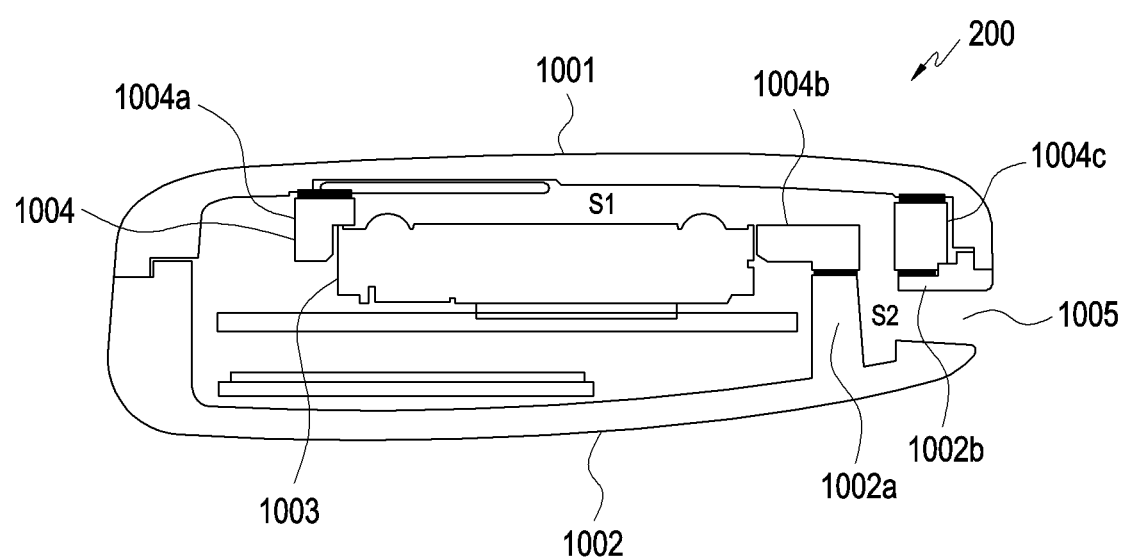
FIG. 10 is a sectional view illustrating the electronic device of FIG. 2, taken along a direction A-A' according to another embodiment of the disclosure.

FIG. 10 is a sectional view illustrating one side of the electronic device illustrated FIG. 2, taken along a direction A-A' according to another embodiment of the disclosure.

The electronic device (e.g., the electronic device 200 of FIGS. 1 to 4) may include a speaker module 1006 disposed in a housing (e.g., the housing 203 of FIG. 2). A speaker module mounting structure may include a part (e.g., an upper case 1001 and a lower case 1002) of the housing and the speaker module 1006. According to an embodiment, the speaker module mounting structure may include the upper case 1001, the lower case 1002, a speaker 1003, and a bracket 1004 providing an internal space for disposing the speaker 1003 therein. A structure in which the speaker 1003 is disposed in the internal space of the bracket 1004 may be the speaker module 1006, and the speaker module 1006 may be mounted in the upper case 1001 and the lower case 1002 of the housing 203.

The configurations of the speaker 1003, the bracket 1004, the upper case 1001, and the lower case 1002 included in the speaker module mounting structure of FIG. 10 may be fully or partially identical to those of the speaker 510, the bracket 520, the upper case 530, and the lower case 540 included the in speaker module mounting structure of FIGS. 5 to 7.

A first coupling portion 1004*a* and a third coupling portion 1004*c* of the bracket 1004 may be sealed with the upper case by a sealing member (e.g., poron, rubber, tape, or bonding) to form a first region S1 between the speaker module 1006 and the upper case 1001. A second coupling portion 1004*b* of the bracket 1004 may be sealed with a first portion 1002*a* of the lower case 1002 by the sealing member, and the third coupling portion 1003 of the bracket 1004 may be sealed with a second portion 1002*b* of the lower case 1001 at which the upper case 1001 and the lower case 1002 are coupled with each other by the sealing member to form a second region S2 between the speaker module 1006 and the lower case 1002. In this case, the front sound of the speaker module 1006 may be radiated through the first region S1, transferred to the second region S2, and radiated to the outside through an opening 1005 of the lower case 1002.

Figure 11:
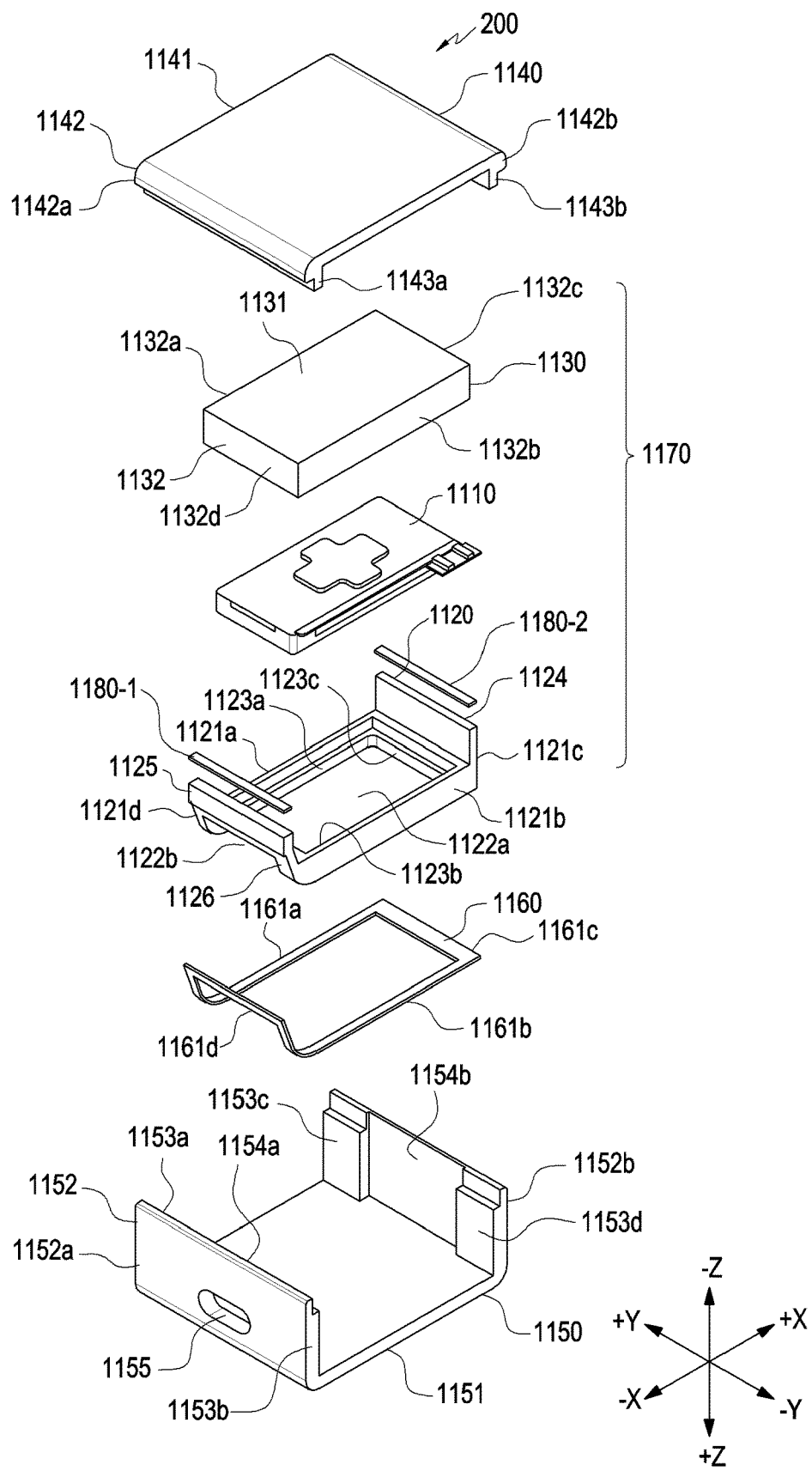
FIG. 11 is an exploded perspective view illustrating a speaker module mounting structure formed on one side of an electronic device according to another embodiment of the disclosure.
Figure 12:
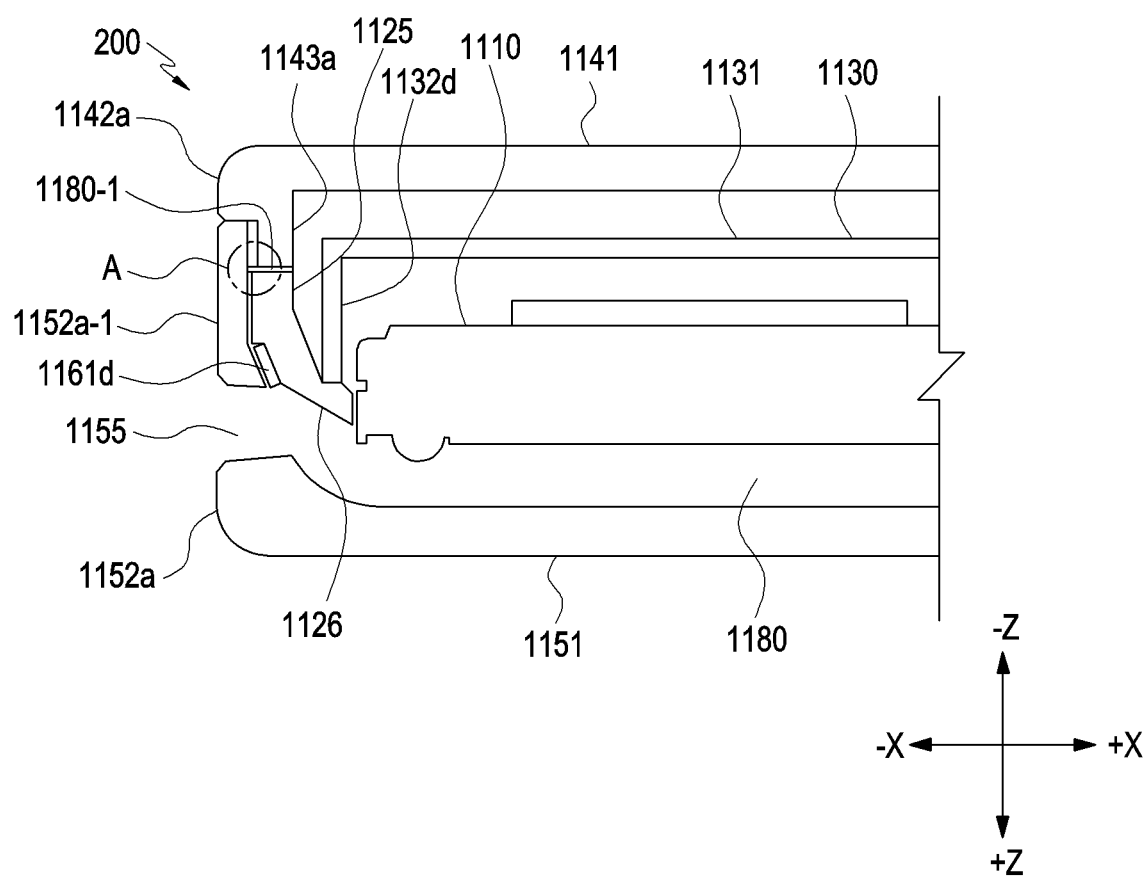
FIG. 12 is a sectional view illustrating the electronic device of FIG. 2, taken along a direction A-A' according to another embodiment of the disclosure.

FIG. 11 is an exploded perspective view illustrating a speaker module mounting structure formed on one side of an electronic device according to another embodiment of the disclosure, and FIG. 12 is a sectional view illustrating one side of the electronic device of FIG. 2, taken along the direction A-A'.

Referring to FIGS. 11 and 12, a speaker module may be provided as a structure in which a bracket is coupled with a separate carrier including a speaker.

According to certain embodiments, the electronic device (e.g., the electronic device 200 of FIGS. 1 to 4) may include a speaker module 1170 disposed in a housing (e.g., the housing 203 of FIG. 2). The speaker module mounting structure may include a part (e.g., an upper case 1140 and a lower case 1150) of the housing and the speaker module 1170. According to an embodiment, the speaker module mounting structure may include the upper case 1140, the lower case 1150, a speaker 1110, a bracket 1120 providing an internal space for disposing the speaker 1110 therein, a cover 1130 coupled with the bracket 1120 to shield the rear sound of the speaker 1110, and a sealing member 1160 disposed between the bracket 1120 and the lower case 1150. A structure in which the speaker 1110 is disposed in the internal space of the bracket 1120 and the cover 1130 is coupled on the speaker 1110 may be the speaker module 1170, and the speaker module 1170 may be mounted in the upper case 1140 and the lower case 1150 of the housing 203.

The configurations of the speaker 1110, the bracket 1120, the upper case 1140, the lower case 1150, and the sealing member 1160 of FIGS. 11 and 12 may be fully or partially identical to those of the speaker 510, the bracket 520, the upper case 530, the lower case 540, and the sealing member 550 of FIGS. 5 to 7.

The lower case 1150 of the housing 203 may include a first plate 1151 and a sidewall 1152 extending from the first plate 1151 in the first direction (−Z-axis direction). The side wall 1152 may include a first sidewall 1152*a* formed to extend from the first plate 1151 and face the third direction (−X-axis direction), and a second sidewall 1152*b* formed to extend from the first plate 1151 and face the fourth direction (+X-axis direction).

The first sidewall 1152*a* may include a first protrusion 1153*a* and a second protrusion 1153*b* protruding from the inner surface of the first sidewall 1152*a* to a space for mounting the speaker module 1170 therein (e.g., protruding in the fourth direction (+X-axis direction). The first protrusion 1153*a* and the second protrusion 1153*b* may be spaced apart from each other. According to an embodiment, a first recess 1154*a* may be formed between the first protrusion 1153*a* and the second protrusion 1153*b* on the inner surface of the first sidewall 1152*a*. According to an embodiment, the first sidewall 1152*a* may include an opening 1155 through which the front sound of the speaker module 1170 is discharged to the outside along a conduit 1180, at a part between the first protrusion 1153*a* and the second protrusion 1153*b*.

The second sidewall 1152*b* may include a third protrusion 1153*c* and a fourth protrusion 1153*d* which protrude from the inner surface of the second sidewall 1152*b* into the space for mounting the speaker module 1170 therein and face the first protrusion 1153*a* and the second protrusion 1153*b*, respectively. The third protrusion 1153*c* and the fourth protrusion 1153*d* may be spaced apart from each other. According to an embodiment, a second recess 1154*b* may be formed between the third protrusion 1153*c* and the fourth protrusion 1153*d* on the inner surface of the second sidewall 1152*b*.

The upper case 1140 of the housing 203 may include a first plate 1141 and a sidewall 1142 extending from the first plate 1141 in the second direction (+Z-axis direction). The sidewall 1142 may include a first sidewall 1142*a* formed to extend from the first plate 1141 and face the third direction (−X-axis direction), and a second sidewall 1142*b* formed to extend from the first plate 1141 and face the fourth direction (+X-axis direction). According to an embodiment, the first sidewall 1142*a* may include a first protrusion 1143*a* protruding from the inner surface of the first sidewall 1142*a* (e.g., protruding in the second direction (+Z-axis direction)). According to an embodiment, the second sidewall 1142*b* may include a second protrusion 1143*b* protruding from the inner surface of the second sidewall 1142*b* (e.g., protruding in the second direction (+Z-axis direction)).

The bracket 1120 may include a first sidewall 1121*a* disposed in the sixth direction (+Y-axis direction), a second sidewall 1121*b* disposed in the fifth direction (−Y-axis direction) opposite to the sixth direction (+Y-axis direction), a third sidewall 1121*c* disposed in the fourth direction (+X-axis direction), and a fourth sidewall 1121*d* in the third direction (−X-axis direction) opposite to the fourth direction.

The bracket 1120 may include a first opening 1122*a* formed by combining the first sidewall 1121*a*, the second sidewall 1121*b*, the third sidewall 1121*c*, and the fourth sidewall 1121*d*.

The first sidewall 1121*a* of the bracket 1120 may include a first protrusion 1123*a* protruding from the inner surface of the first sidewall 1121*a* (e.g., protruding in the fifth direction (−Y-axis direction) so that the speaker 1110 may be disposed on the first protrusion 1123*a*. According to an embodiment, the second sidewall 1121*b* of the bracket 1120 may include a second protrusion 1123*b* protruding from the inner surface of the second sidewall 1121*b* (e.g., protruding in the sixth direction (+Y-axis direction) so that the speaker 1110 may be disposed on the second protrusion 1123*b*. According to an embodiment, the third sidewall 1121*c* of the bracket 1120 may include a third protrusion 1123*c* protruding from the inner surface of the third sidewall 1121*c* (e.g., protruding in the third direction (−X-axis direction)) so that the speaker 1110 may be mounted on the third protrusion 1121c, and a protrusion 1124 protruding (e.g., protruding in the first direction (−Z-axis direction)) to be coupled with the second sidewall 1142b of the upper case 113 of the housing 203. According to an embodiment, the fourth sidewall 1121d of the bracket 1120 may include a coupling portion 1125 coupled with the first sidewall 1142a of the upper case 1140 and the first sidewall 1152a of the lower case 1150 in the housing 203. The fourth sidewall 1121d may include a connecting portion 1125 that couples the coupling portion 1125 to the first sidewall 1121a of the bracket 1120 and the second sidewall 1121b of the bracket 1120. The connecting portion 1126 may include a second opening 1122b extending from the first opening 1122a.

The cover 1130 may include a first plate 1131 and a sidewall 1132 extending from the first plate 1131 in the second direction (+Z-axis direction). The sidewall 1132 may include a first sidewall 1132a formed to extend from the first plate 1131 and face the sixth direction (+Y-axis direction), a second sidewall 1132b formed to extend from the first plate 1131 and face the fifth direction (−Y-axis direction), a third sidewall 1132c formed to extend from the first plate 1131 and face the fourth direction (+X-axis direction), and a fourth sidewall 1132d formed to extend from the first plate 1131 and face the third direction (−X-axis direction). The first sidewall 1132a and the second sidewall 1132b may be parallel to each other, and the third sidewall 1132c and the fourth sidewall 1132d may be parallel to each other.

The sealing member 1160 may include a first sealing portion 1161a disposed between the first sidewall 1121a of the bracket 1120 and the first plate 1151 of the lower case 1150, a second sealing portion 1161b disposed between the second sidewall 1121b of the bracket 1120 and the first plate 1151 of the lower case 1150, a third sealing portion 1161c disposed between the third sidewall 1121c of the bracket 1120 and the first plate 1151 of the lower case 1150, and a fourth sealing portion 1161d disposed between the connecting portion 1126 included in the fourth sidewall 1121d of the bracket 1120 and the first recess 1154a included in the first sidewall 1152a of the lower case 1150. According to an embodiment, the first sealing portion 1161a, the second sealing portion 1161b, the third sealing portion 1161c, and the fourth sealing portion 1161d of the sealing member 1160 may be disposed in the shape of a closed loop along a contact surface on which the bracket 1120 contacts the first plate 1150 of the lower case 1150 and a part of the first sidewall 1152a of the lower case 1150, to block sound waves in the internal space from leaking in a path other than a specific area or prevent introduction of a foreign material including a fluid or the like. The sealing member 1160 may include, for example, poron, tape, rubber, or bonding.

In the speaker module mounting structure, the speaker 1110 may be disposed in an internal space formed by combining the first sidewall 1121a, the second sidewall 1121b, the third sidewall 112c, and the fourth sidewall 1121d of the bracket 1120. According to an embodiment, the speaker 1110 may be fixed by the first protrusion 1123a of the first sidewall 1121a of the bracket 1120, the second protrusion 1123b of the second sidewall 1121b of the bracket 1120, and the third protrusion 1123c of the third sidewall 1121c of the bracket 1120. According to an embodiment, the first sidewall 1121a of the bracket 1120 in which the speaker 1110 is disposed may be coupled with the first sidewall 1132a of the cover 1130 and sealed by the sealing member. According to an embodiment, the second sidewall 1121b of the bracket 1120 in which the speaker 1110 is disposed may be coupled to the second sidewall 1132b of the cover 1130 and sealed by the sealing member. According to an embodiment, the third sidewall 1121c of the bracket 1120 in which the speaker 1110 is disposed may be coupled to the third sidewall 1132c of the cover 1130 and sealed by the sealing member. According to an embodiment, a part of the connecting portion 1126 included in the fourth sidewall 1121d of the bracket 1120 in which the speaker 1110 is disposed may be coupled to the fourth sidewall 1132d of the cover 1130 and sealed by the sealing member. As the cover 1130 is coupled with the bracket 1120 with the speaker 1110 disposed therein, the rear sound of the speaker 1110 may be effectively blocked.

In the speaker module mounting structure, the speaker module 1170 may be mounted in the lower case 1150 of the housing 203. According to one embodiment, the third sidewall 1121c including the third protrusion 1123c in the bracket 1120 may be mounted in the second recess 1154b formed between the third protrusion 1153c and the fourth protrusion 1153d of the second sidewall 1152b of the lower case 1150. When the speaker module 1170 is mounted in the lower case 1150, the protrusion 1124 included in the third sidewall 1121c of the bracket 1120 may be disposed to the same height as the third protrusion 1153c and the fourth protrusion 1153d of the second side wall 1152b of the lower case 1150 in the first direction (−Z-axis direction).

The fourth sidewall 1121d of the bracket 1120, which includes the coupling portion 1125 and the connecting portion 1126, may be mounted in the first recess 1154a formed between the first protrusion 1153a and the second protrusion 1153b of the first sidewall 1152a of the lower case 1150. When the speaker module 1170 is mounted in the lower case 1150, the coupling portion 1125 included in the fourth sidewall 1121d of the bracket 1120 may be disposed to the same height as the first protrusion 1153a and the second protrusion 1153b of the first sidewall 1150 in the first direction (−Z-axis direction).

A duct length of the speaker may be reduced or the size of the speaker module may be secured, according to the depth to which the speaker module 1170 is mounted on the sidewall 1152 of the lower case 1150. When the speaker module 1170 is mounted in the lower case 1150, the first sidewall 1121a of the bracket 1120 may be sealed by the first sealing portion 1161a of the sealing member 1160 between the first sidewall 1121a of the bracket 1120 and the first plate 1151 of the lower case 1150. According to an embodiment, the second sidewall 1121b of the bracket 1120 may be sealed by the second sealing portion 1161b of the sealing member 1160 between the second sidewall 1121b of the bracket 1120 and the first plate 1151 of the lower case 1150. According to an embodiment, the third sidewall 1121c of the bracket 1120 may be sealed by the third sealing portion 1161c of the sealing member 1160 between the third sidewall 1121c of the bracket 1120 and the first plate 1151 of the lower case 1150. According to an embodiment, the connecting portion 1126 of the fourth sidewall 1121d of the bracket 1120 may be sealed by the fourth sealing portion 1161d of the sealing member 1160 between the connecting portion 1126 of the fourth sidewall 1121d of the bracket 1120 and the first sidewall 1152a of the lower case 1150. When the speaker module 1170 is mounted in the lower case 1150, a conduit 1180 may be formed between the first opening 1122a and the second opening 1122b of the bracket 1120 and the first plate 1151 of the lower case 1150.

In the speaker module mounting structure, the lower case 1150 of the housing 203 with the speaker module 1170 mounted therein may be coupled with the upper case 1140 of the housing 203. According to an embodiment, the first protrusion part 1143a of the first side wall 1142a of the upper case 1140 may be coupled in a space formed by the height difference in the first direction (−Z-axis direction) between the first sidewall 1152a of the lower case 1150 and the first protrusion 1153a of the first sidewall 1152a, the second protrusion 1153b of the first sidewall 1152a, and the coupling portion 1125 of the fourth sidewall 1121d of the bracket 1120. According to an embodiment, the first protrusion 1143a of the first sidewall 1142a of the upper case 1140 may be sealed with the coupling portion 1125 of the fourth sidewall 1121d of the bracket 1120 by a sealing member 1180-1. According to an embodiment, the second protrusion 1143b of the second sidewall 1142b of the upper case 1140 may be coupled in a space formed by the height difference in the first direction (−Z-axis direction) between the second sidewall 1152b of the lower case 1150 and the third protrusion 1153c of the second sidewall 1152b, the fourth protrusion 1153d of the second sidewall 1152b, and the protrusion 1124 of the third sidewall 1121c of the bracket 1120. According to an embodiment, the second protrusion 1143b of the second sidewall 1142b of the upper case 1140 may be sealed with the protrusion 1124 of the third sidewall 1121c of the bracket 1120 by a sealing member 1180-2.

In a part A where the first protrusion 1143a of the first sidewall 1142a of the upper case 1140, the first sidewall 1152a of the lower case 1150, and the coupling portion 1125 of the bracket 1120 are coupled with one another, the coupling portion 1125 of the bracket 1120 may be coupled and sealed with both of the first protrusion 1143a of the first sidewall 1142a of the upper case 1140 and the first sidewall 1152a of the lower case 1150 by the sealing member 1180-1. Therefore, the leakage of the front sound of the speaker module 1170 may be prevented. Specific embodiments of the structure in which the coupling portion 1125 of the bracket 1120 is coupled and sealed with both of the first protrusion 1143a of the first sidewall 1142a of the upper case 1140 and the first sidewall 1152a of the lower case 1150 may be applied to the afore-described embodiments of FIGS. 8 and 9.

According to certain embodiments of the disclosure, an apparatus (e.g., the speaker module mounting structure of FIG. 5) may include an upper case (e.g., upper case 530 in FIGS. 5 to 7) facing a first direction, a lower case (e.g., lower case 540 in FIGS. 5 to 7) facing a second direction opposite to the first direction coupled to the upper case, thereby forming an internal space, a speaker module (e.g., speaker module 560 in FIGS. 5 to 7) disposed in an internal space formed by coupling the upper case and the lower case, wherein the speaker module includes a speaker (speaker 510 in FIGS. 5 to 7), and bracket (bracket 520 in FIGS. 5 to 7) surrounding at least a part of the speaker and including a first opening (FIG. 5, first opening 522a) for sound generated from the speaker, wherein the bracket includes at least one first part (FIG. 5, first part 524) coupled with the upper case and at least one second part (FIG. 5, at least one second part 526) coupled with the lower case, at least one first sealing member (FIG. 5, sealing member 570-1, 570-2) disposed on the at least one first part of the bracket and sealing the bracket and the upper case, and a second sealing member (FIG. 5, sealing member 550) disposed on the at least one second part of the bracket and sealing the sound bracket and the lower housing.

According to certain embodiments, the at least one second part of the bracket may include an outer surface of the bracket in the second direction.

According to certain embodiments, the second sealing member may be disposed along the outer surface and form a single closed loop.

According to certain embodiments, the at least one first sealing member or the second sealing member may comprise at least one of poron, rubber, a tape, and bonding.

According to certain embodiments, the at least one first part of the sound bracket may further include a part coupled with the lower case.

According to certain embodiments, the at least one first part of the bracket may be disposed to face an inner sidewall of the upper case, and the at least one first sealing member may be disposed between the inner sidewall of the upper case and the at least one first part of the bracket.

According to certain embodiments, the inner sidewall of the second housing includes a recess (e.g., 544a in FIGS. 5 to 7), the at least one first part of the bracket may be inserted into the recess, and the at least one first sealing member may be disposed between the recess and the at least one first part of the bracket.

According to certain embodiments, when the bracket and the lower case are coupled with each other, the first opening of the bracket forming a conduit (e.g., 570 in FIGS. 5 to 7) for the sound.

According to certain embodiments, the upper case or the lower case may include a second opening (e.g., 545 in FIGS. 5 to 7) through which the sound is emitted to an outside.

According to certain embodiments, the electronic device may further include a cover (e.g., 1130 in FIGS. 11 and 12) including a plate facing the first direction and a sidewall surrounding the plate from the second direction, and the cover may be disposed between the upper case and the speaker and configured to prevent leakage of sound from an internal space formed by being coupled with the speaker module.

According to certain embodiments of the disclosure, an electronic device (e.g., the electronic device 200 of FIGS. 1 to 4) may include a lens frame (e.g., 202 in FIGS. 1 to 4) accommodating a display member therein, a wearing member (e.g., 203 in FIGS. 1 to 4) extended from the lens frame, and including a first case (e.g., 233 in FIGS. 1 to 4 and upper case 530 in FIGS. 5 to 7) forming an outside of the wearing member and a second case (e.g., 321 in FIGS. 1 to 4 and lower case 540 in FIGS. 5 to 7) forming an inside of the wearing member, a speaker module (e.g., speaker module 560 in FIGS. 5 to 7) disposed inside the wearing member, wherein the speaker module includes a speaker (e.g., speaker 510 in FIGS. 5 to 7), and a bracket (e.g., 520 in FIGS. 5 to 7) surrounding at least a part of the speaker and including a first opening (FIG. 5, first opening 522a) for a sound generated from the speaker, wherein the bracket includes at least one first part (FIG. 5, first part 524) coupled with the first case and at least one second part (FIG. 5, second part 526) coupled with the second case, a first sealing member (FIG. 5, sealing member 570-1, 570-2) disposed on the at least one first part of the bracket and sealing the bracket and the first case, and a second sealing member (FIG. 5, sealing member 550) disposed on the at least one second part of the bracket and sealing the bracket and the second case.

According to certain embodiments, the at least one second part of the bracket may include an outer surface of the bracket.

According to certain embodiments, the second sealing member may be disposed along the outer surface and form a single closed loop.

According to certain embodiments, the first sealing member or the second sealing member may comprises at least one of poron, rubber, a tape, and bonding.

According to certain embodiments, the at least one first part of the bracket may further include a part coupled with the second case.

According to certain embodiments, the at least one first part of the bracket may be disposed to face an inner sidewall of the first case, and the at least one first sealing member may be disposed between the inner sidewall of the first case and the at least one first part of the bracket.

According to certain embodiments, the inner sidewall of the second case may include a recess (e.g., 544a in FIGS. 5 to 7), the at least one first part of the sound bracket may be inserted into the recess, and the first sealing member may be disposed between the recess and the at least one first part of the sound bracket.

According to certain embodiments, when the bracket and the second case are coupled with each other, the first opening of the sound bracket may form a conduit for the sound.

According to certain embodiments, the second case may include a second opening through which the first sound is emitted to the outside.

According to certain embodiments, the electronic device may further include a cover (e.g., 1130 in FIGS. 11 and 12) including a plate and a sidewall surrounding the plate, and the cover may be disposed between the first case and the speaker module, and configured to prevent leakage of the sound from an internal space formed by the plate and the sidewall by being coupled with the sound module.

The electronic device including the above-described various speaker modules of the disclosure is not limited to the above-described embodiments and drawings. It will be apparent to those skilled in the art that many replacements, modifications, and variations can be made within the technical scope of the disclosure.

What is claimed is:

1. An apparatus comprising:
   an upper case facing a first direction;
   a lower case facing a second direction opposite to the first direction, the lower case coupled to the upper case, thereby forming an internal space;
   a speaker module disposed in the internal space, wherein the speaker module includes:
   a speaker;
   a bracket surrounding at least a part of the speaker, the bracket comprising:
      a first opening positioned to receive sound generated from the speaker;
      at least one first part coupled with the upper case; and
      at least one second part coupled with the lower case;
   at least one first sealing member disposed on the at least one first part of the bracket and sealing the bracket and the upper case; and
   a second sealing member disposed on the at least one second part of the bracket and sealing the bracket and the lower case,
   wherein an inner side wall of the lower case includes a recess, and the at least one second part of the bracket is inserted into the recess.

2. The apparatus according to claim 1, wherein the at least one second part of the bracket includes an outer surface of the bracket in the second direction.

3. The apparatus according to claim 2, wherein the second sealing member is disposed along the outer surface and forms a single closed loop.

4. The apparatus according to claim 1, wherein the at least one first sealing member or the second sealing member comprises at least one of poron, rubber, a tape, and bonding.

5. The apparatus according to claim 1, wherein the at least one first part of the bracket further includes a part coupled with the lower case.

6. The apparatus according to claim 1, wherein the at least one first part of the bracket is disposed to face an inner sidewall of the upper case, and
   wherein the at least one first sealing member is disposed between the inner sidewall of the upper case and the at least one first part of the bracket.

7. The apparatus according to claim 1, wherein when the bracket and the lower case are coupled with each other, the first opening of the bracket forming a conduit for the sound.

8. The apparatus according to claim 1, wherein the upper case or the lower case includes a second opening through which the sound is emitted to an outside.

9. The apparatus according to claim 1, further comprising a cover including a plate facing the first direction and a sidewall surrounding the plate from the second direction,
   wherein the cover is disposed between the upper case and the speaker module and configured to prevent leakage of the sound generated from the speaker from an internal space formed by being coupled with the speaker module.

10. The apparatus of claim 1, wherein the second sealing member is disposed between the recess and the at least one second part of the bracket.

11. An electronic device comprising:
    a lens frame accommodating a display member therein;
    a wearing member extended from the lens frame, and including a first case forming an outside of the wearing member and a second case forming an inside of the wearing member;
    a speaker module disposed inside the wearing member, wherein the speaker module includes:
    a speaker; and
    a bracket surrounding at least a part of the speaker and including a first opening positioned to receive sound generated from the speaker, wherein the bracket comprises:
       at least one first part coupled with the first case; and
       at least one second part coupled with the second case;
       at least one first sealing member disposed on the at least one first part of the bracket and sealing the bracket and the first case; and
    a second sealing member disposed on the at least one second part of the bracket and sealing the bracket and the second case,
    wherein an inner side wall of the second case includes a recess, and the at least one second part of the bracket is inserted into the recess.

12. The electronic device according to claim 11, wherein the at least one second part of the bracket includes an outer surface of the bracket.

13. The electronic device according to claim 12, wherein the second sealing member is disposed along the outer surface and forms a single closed loop.

14. The electronic device according to claim 11, wherein the at least one first sealing member or the second sealing member includes at least one of poron, rubber, a tape, and bonding.

15. The electronic device according to claim 11, wherein the at least one first part of the bracket further includes a part coupled with the second case.

16. The electronic device according to claim 11, wherein the at least one first part of the bracket is disposed to face an inner sidewall of the first case, and wherein the at least one first sealing member is disposed between the inner sidewall of the first case and the at least one first part of the bracket.

17. The electronic device according to claim 11, wherein the second sealing member is disposed between the recess and the at least one second part of the bracket.

18. The electronic device according to claim 11, wherein when the bracket and the second case are coupled with each other, the first opening of the bracket forms a conduit for the sound.

19. The electronic device according to claim 11, wherein the second case includes a second opening through which the sound is emitted to the outside.

20. The electronic device according to claim 11, further comprising a cover including a plate and a sidewall surrounding the plate, wherein the cover is disposed between the first case and the speaker module, and configured to prevent leakage of the sound from an internal space formed by the plate and the sidewall by being coupled with the speaker module.

\* \* \* \* \*